United States Patent
Rakib

(10) Patent No.: US 8,863,213 B2
(45) Date of Patent: Oct. 14, 2014

(54) METHODS OF ADAPTIVE CANCELLING AND SECONDARY COMMUNICATIONS CHANNELS FOR EXTENDED CAPABILITY HFC CABLE SYSTEMS

(75) Inventor: Shlomo Selim Rakib, Santa Clara, CA (US)

(73) Assignee: Gainspeed, Inc., Sunnyvale, CA (US)

( * ) Notice: Subject to any disclaimer, the term of this patent is extended or adjusted under 35 U.S.C. 154(b) by 165 days.

(21) Appl. No.: 13/400,415

(22) Filed: Feb. 20, 2012

(65) Prior Publication Data

US 2012/0151548 A1    Jun. 14, 2012

Related U.S. Application Data

(63) Continuation-in-part of application No. 12/907,970, filed on Oct. 19, 2010, which is a continuation-in-part of application No. 12/692,582, filed on Jan. 22, 2010, now Pat. No. 8,311,412, application No. 13/400,415, which is a continuation-in-part of application No. 13/346,709, filed on Jan. 9, 2012, now Pat. No. 8,510,786.

(60) Provisional application No. 61/385,125, filed on Sep. 21, 2010.

(51) Int. Cl.
*H04N 7/173*    (2011.01)
*H04N 7/10*    (2006.01)
*H04N 7/22*    (2006.01)

(52) U.S. Cl.
CPC ... *H04N 7/10* (2013.01); *H04N 7/22* (2013.01)
USPC .......................................... 725/111; 725/129

(58) Field of Classification Search
None
See application file for complete search history.

(56) References Cited

U.S. PATENT DOCUMENTS

| 5,915,205 A * | 6/1999 | Chen ............................. 725/125 |
| 2007/0274721 A1* | 11/2007 | Barker et al. .................. 398/66 |
| 2009/0232500 A1* | 9/2009 | Villarruel et al. ............... 398/65 |

\* cited by examiner

*Primary Examiner* — Brian T Pendleton
*Assistant Examiner* — Dika C. Okeke
(74) *Attorney, Agent, or Firm* — Stephen E. Zweig

(57) ABSTRACT

A method to extend the downstream and upstream data carrying capability of an HFC CATV system. At the neighborhood level, the CATV cable (the primary channel) is divided into different segments connected by electrically active junctions. At the junctions, each segment is also connected to a secondary data channel, such as an optical fiber or ultrahigh RF frequency (1 GHz+) secondary channel, which can carry supplemental downstream narrowcast channels and upstream channels between a plurality of such CATV cable segments. At the junctions, some CATV primary channel RF signals such as broadcast channels are passed without interference, while certain primary channel downstream narrowcast RF channels and upstream narrowcast RF channels are precisely suppressed using adaptive cancelling methods. Such adaptive cancellation methods are superior to prior art lowpass, highpass, and bandpass filtering methods because they allow for more efficient use of limited CATV primary channel RF spectrum.

14 Claims, 18 Drawing Sheets

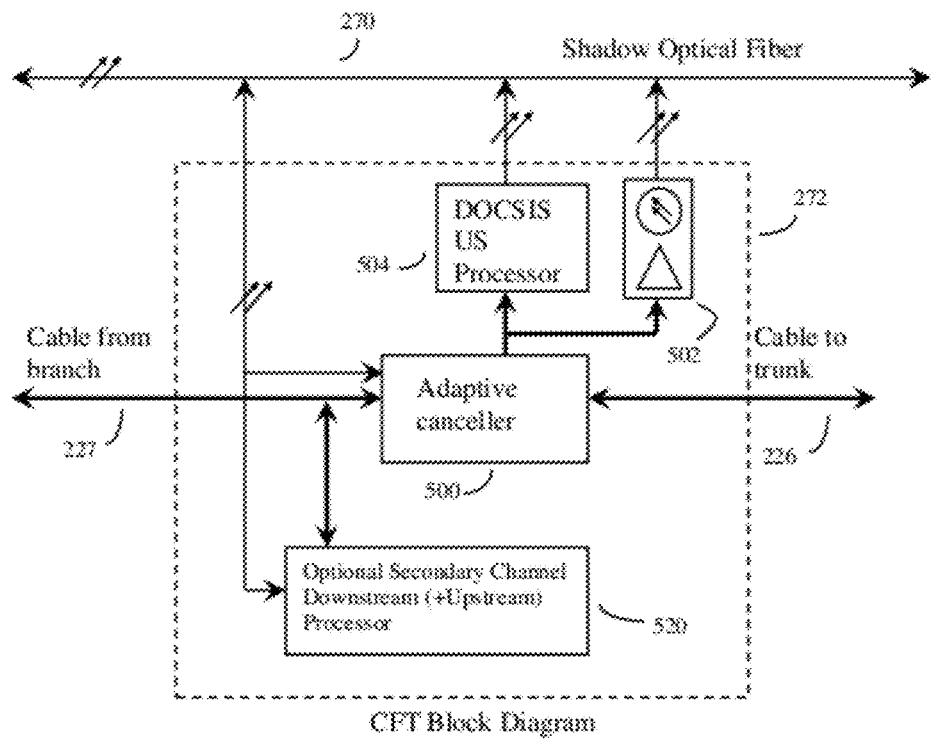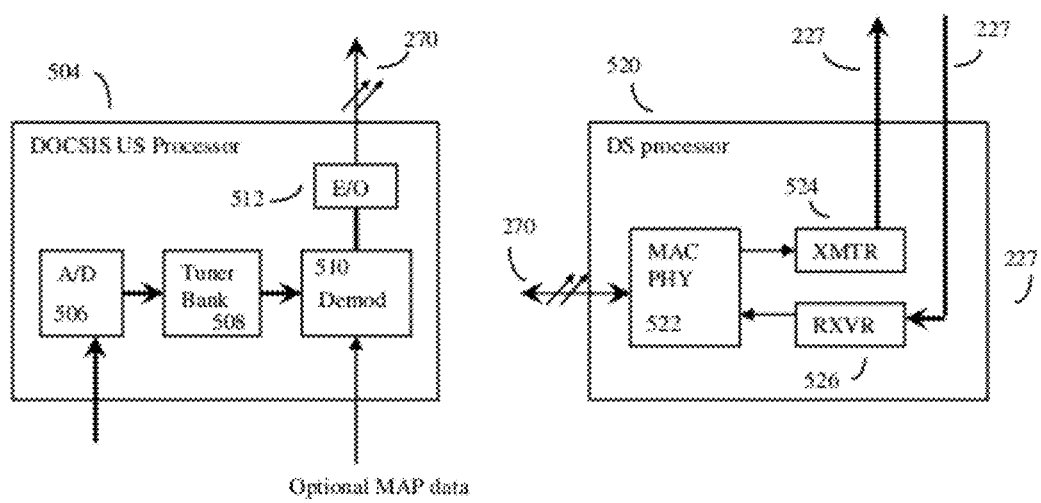

Figure 14
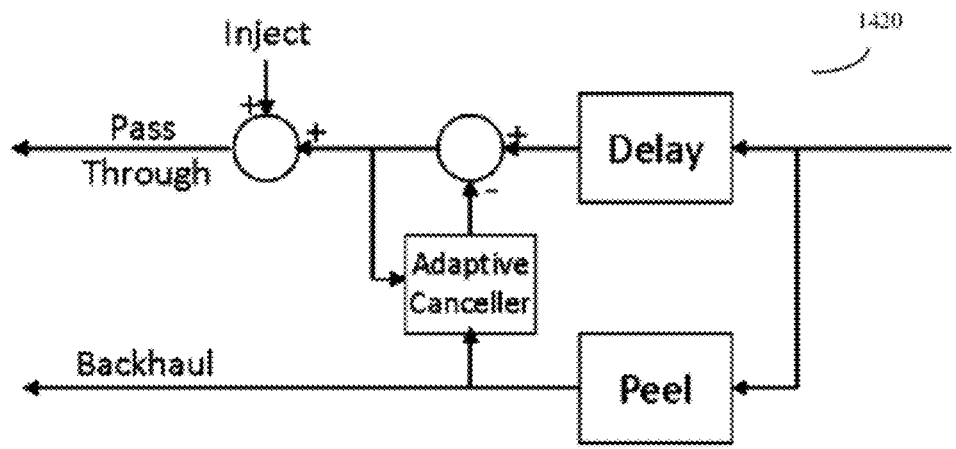
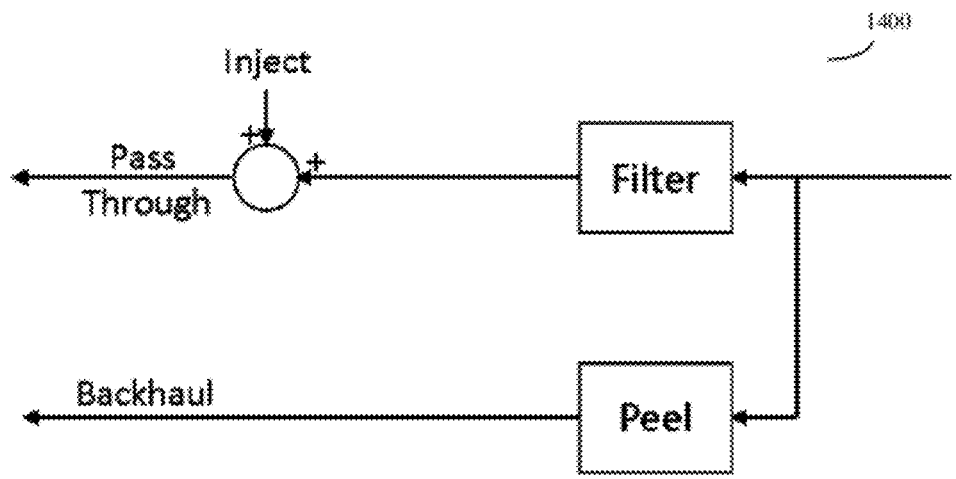

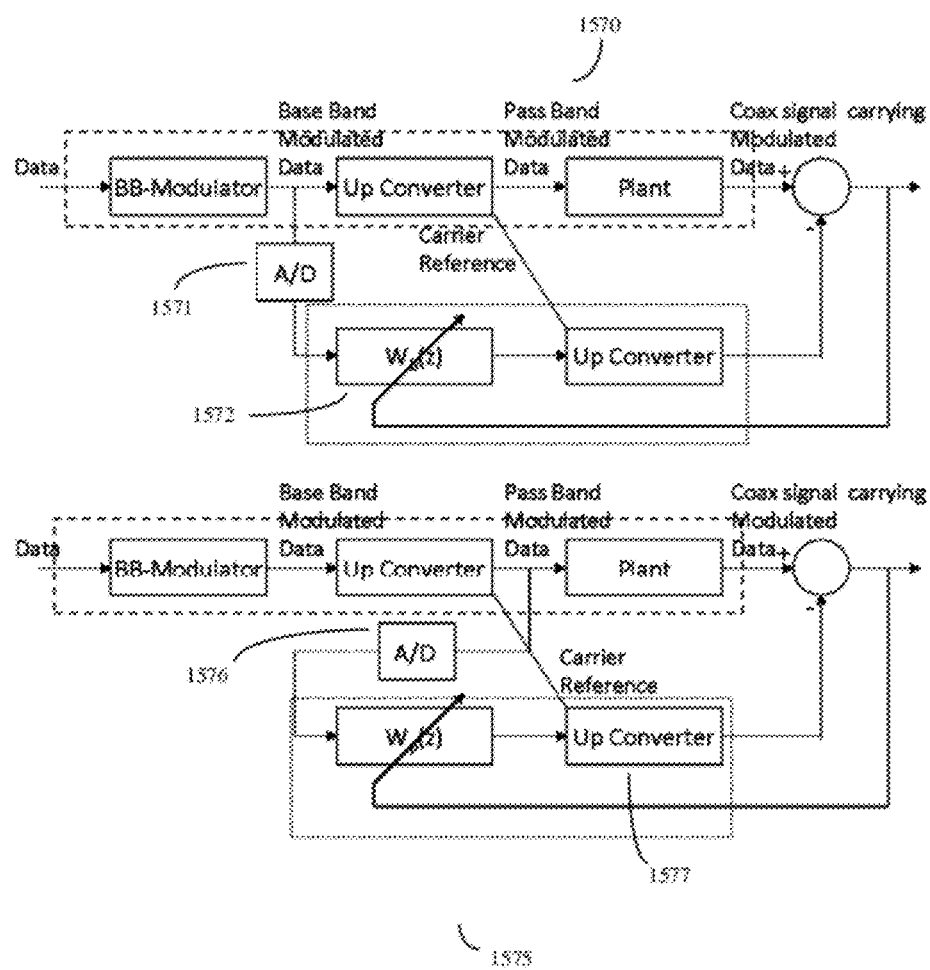

METHODS OF ADAPTIVE CANCELLING AND SECONDARY COMMUNICATIONS CHANNELS FOR EXTENDED CAPABILITY HFC CABLE SYSTEMS

CROSS REFERENCE TO RELATED APPLICATIONS

This application is a continuation in part of U.S. patent application Ser. No. 12/907,970, "HFC CABLE SYSTEM WITH SHADOW FIBER AND COAX FIBER TERMINALS", filed Oct. 19, 2010, and also a continuation in part of U.S. patent application Ser. No. 13/346,709, "HFC CABLE SYSTEM WITH WIDEBAND COMMUNICATIONS PATHWAY AND COAX DOMAIN NODES", filed Jan. 9, 2012, which itself was a continuation in part of application Ser. No. 12/907,970; both applications in turn in turn claimed the priority benefit of U.S. provisional application 61/385,125 "IMPROVED HYBRID FIBER CABLE SYSTEM AND METHOD", filed Sep. 21, 2010, inventor Shlomo Rakib; and U.S. patent application Ser. No. 12/692,582, "DISTRIBUTED CABLE MODEM TERMINATION SYSTEM" filed Jan. 22, 2010, inventor Shlomo Rakib; this application is also a continuation in part of U.S. patent application Ser. No. 12/692,582, "DISTRIBUTED CABLE MODEM TERMINATION SYSTEM" filed Jan. 22, 2010, inventor Shlomo Rakib; the contents of all of these applications are incorporated herein by reference.

FIELD OF THE INVENTION

The invention is in the general field of adaptive signal cancellation technologies, particularly as applied to Cable Television and Hybrid Fiber Cable systems for purposes of providing extended data handling capability.

BACKGROUND OF THE INVENTION

Adaptive cancellation technology is widely used in the fields of audio engineering and in many other areas of signal processing as well. As applied to audio engineering, adaptive cancelling is often used for echo cancellation and noise suppression. The general principle is to remove an unwanted component of a main signal, such as an audio signal, by obtaining a reference version of the unwanted signal, and feeding this unwanted signal back into an electrical circuit that uses an adaptive cancellation processor to detect the unwanted reference signal in the main signal. The adaptive cancellation processor uses the reference version of the unwanted signal to find the corresponding unwanted signal in the main signal, makes suitable timing, phase, amplitude and other corrections to obtain a precise match, and then subtracts the reference unwanted signal from the main signal, thus producing a cleaned up version of the main signal that, for example, has the unwanted echo or noise background suppressed. The methods often rely on an adaptive filtering algorithm or device that minimizes the mean square errors between the main signal, and the reference unwanted signal.

Examples of adaptive cancelling technology can be found in various publications. These include Kuo et. al., "Active Noise Control: A Tutorial Review", Proceedings of the IEEE 87(6), June 1999, pages 943-973; Naylor et. al., "Adaptive algorithms for sparse echo cancellation", Signal Processing 86 (2006), pages 1182-1192; Gilloire and Vetterli, "Adaptive Filtering in Subbands with Critical Sampling: Analysis, Experiments, and Application to Acoustic Echo Cancellation", IEEE Transactions on Signal Processing 40(8), August 1992, pages 1862-1975; and Wang, "Low-Power Filtering via Adaptive Error-Cancellation", IEEE Transactions on Signal Processing 51(2), February 2003, pages 575-583.

Turning to a different area of technology, Cable television (CATV), originally introduced in the late 1940's as a way to transmit television signals by coaxial cables to houses in areas of poor reception, has over the years been modified and extended to enable the cable medium to transport a growing number of different types of digital data, including both digital television and broadband Internet data.

Over the years, this 1940's and 1950's era system has been extended to provide more and more functionality. In recent years, the CATV system has been extended by the use of optical fibers to handle much of the load of transmitting data from the many different CATV cables handling local neighborhoods, and the cable head or operator of the system. Here the data will often be transmitted for long distances using optical fiber, and the optical (usually infrared light) signals then transformed to the radiofrequency (RF) signals used to communicate over CATV cable (usually in the 5 MHz to about 865 MHz frequencies) by many local optical fiber nodes. Such systems are often referred to as hybrid fiber cable systems, or HFC systems. The complex electronics that are used by the cable operator to inject signals (e.g. data) into the system, as well as extract signals (e.g. data) from the system are often referred to as Cable Modem Termination Systems or CMTS systems.

In a typical HFC system, at the various optical fiber nodes, the optical fiber signals are transformed back into RF signals and are then carried by the various neighborhood CATV coax cables to various households. Unlike fiber, which can carry optical signals for extensive distances without significant signal strength attenuation, the RF signals attenuate fairly rapidly as a function of distance over the CATV coax cables. This attenuation versus distance function increases as the frequency of the RF signals increases. For example, using RG-59 cable, at 10 MHz, the RF signal attenuation versus distance is about 1.1 dB/100 feet, at 100 MHz, the RF signal attenuation versus distance is about 3.4 dB/100 feet, at 400 MHz, the attenuation rate is 7.0 dB/100 feet, and at 1000 MHz (1 GHz), the attenuation rate is 12 dB/100 feet. Other types of coax cables, such as RG-6 cables, have lower attenuation versus distance characteristics, but the same sort of attenuation problem still exists.

Thus, in order to maintain the RF signal of the various upstream and downstream signals while traveling over neighborhood CATV coax cables, neighborhood CATV systems typically employ various active (powered) devices, such as powered forward and reverse (bidirectional) RF amplifiers and the like. At present, using CATV systems that often have a maximum frequency of about 550 or 850 MHz, these active devices are often spaced about every 1000 feet.

Each active device can have several (e.g. 1-4) neighborhood CATV sub-cables connected to it, and often to maintain RF power over cable distances of several thousand feet, more than one (usually 1-3) active devices can be connected along a single stretch of coax cable. As a result, at a neighborhood level, the coax cable wiring pattern of CATV systems often has a "tree" like structure, where the branches of the CATV coaxial cable tree spring off of the various active devices. The first or main CATV coax cable that connects to the RF signal originating from the optical fiber node is often referred to as the "trunk" cable, and the various coax cables that split off of the trunk cable are often referred to as branch cables, and the branch cables in turn can have other branch cables splitting off of them as well. As the various trunk and branch cables cover the local neighborhood, and generally situated in between the various active devices, various taps, splitters, and drops on the neighborhood or "trunk" CATV cable connect various households to the CATV cable. In order to provide power for the various active devices, often the CATV coax cable system will carry electrical power as well. As might be expected, the process of negotiating easements and right of way to route the neighborhood CATV cables is burdensome, however this process has been going on for over 50 years in various parts of the country, and by now is well established.

At present, in United States CATV systems, the 5-42 MHz frequency region is reserved for upstream communications back from the various cable modems to the cable plant/cable head end, and the majority of the bandwidth, typically in the 54-547+MHz range (often the upper end extends to 865 MHz and beyond) is reserved for downstream communications from the cable plant to the various households. European CATV systems follow a slightly different scheme where the upstream communications frequencies extend up to the 65 MHz region, and the downstream communications frequencies are typically in the 88 to about 865 MHz range. The intermediate frequencies between 42-54 MHz (US) and 65-88 MHz (Europe) are generally unused due to the filtering switch over in this region. Due to rapid signal attenuation, the higher frequencies above about 750 to 865 MHz (here referred to generically as 1 GHz+ frequencies or wideband frequencies) are seldom used at present.

A more detailed discussion of prior art in this field can be found in parent application Ser. Nos. 13/346,709, 12/907,970, and 12/692,582, the contents of which are incorporated herein by reference.

Prior art work with various types of CMTS systems and fiber nodes includes Liva et. al., U.S. Pat. No. 7,149,223; Sucharczuk et. al. US patent application 2007/0189770; and Amit, U.S. Pat. No. 7,197,045.

As demand for ever more data carrying capacity both downstream (from the cable head or plant to the various clients) and upstream (from various clients to the cable head and plant) has increased, the finite bandwidth (e.g. data carrying capacity) of CATV systems has become ever more constraining. Thus methods to increase the limited upstream and downstream data carrying capacity of CATV cable are of great commercial interest.

BRIEF SUMMARY OF THE INVENTION

Parent patent application Ser. No. 12/907,970, the contents of which are incorporated herein by reference, disclosed a system and method to extend the upstream data capacity of an HFC CATV system with a primary channel of frequencies below about 1 GHz by creating a parallel secondary channel consisting of a "shadow" optical fiber network that generally would run alongside of the main CATV cable in the various CATV cable neighborhoods. This shadow optical fiber was generally not intended to connect directly to the various households, but instead, would act to help partition the CATV cable system into various sections or domains, each usually serving a plurality of households. The system was also based on Coax fiber terminals (CFT) which could be spaced along the CATV cable in roughly the same location as standard as CATV cable active devices such as RF amplifiers. The CFT had multiple functions. They could intercept local upstream data originating from cable modems and devices from the various neighborhoods, transform this upstream data into upstream optical data, and transfer it to the shadow optical fiber, thus relieving upstream data congestion in the limited bandwidth 5-42 MHz CATV upstream frequency region. The CFT could also enhance downstream data capability by taking optically encoded secondary channel data from the shadow optical fiber, such as narrowcast channels, QAM modulate these optical narrowcast channels to primary channel narrowcast RF signals as needed, and locally inject these narrowcast channels into the various sections of CATV cable (domains) on an as needed basis. The CFT further acted to suppress narrowcast channel transmissions at the junctions between CATV cable segments, thus allowing the same primary channel CATV RF frequencies to be used for different narrowcast channels. The system thus relieved congestion on the primary channel by diverting upstream traffic to the secondary optical channel; and supplemented downstream data on the primary channel by drawing upon the data carrying capacity of the optical fiber secondary channel. The net result was a substantial increase in overall CATV system upstream and downstream data carrying capacity, while at the same time allowing much backward compatibility with existing CATV cable systems.

By contrast, parent application Ser. No. 13/346,709, the contents of which are incorporated herein by reference, disclosed an alternate system and method to extend the data carrying capacity of a hybrid fiber cable (HFC) network, which again would have a standard primary channel in the RF frequencies below about 1 GHz (e.g. approximately 5 to 865 MHz). This alternate approach is based upon the addition of a secondary channel of ultrahigh frequency RF signals above 1 GHz, which would otherwise travel along the same CATV cable as the primary channel. This system was also based on some new types of CATV active devices, such as a new type of Coax Domain Node (CDN) device that could be placed in some of the same location as standard CATV active devices, such as amplifiers. The CDN would be placed in the junctions between cable segments, would generally pass all secondary channel RF signals, but only pass some primary channel RF signals. As a result, the CDN would act to partition the CATV cable portion of the HFC network into a series of smaller segments or domains.

More specifically, in the approximately 5-865 MHz region (e.g. below 1 GHz) the CDN selectively pass some primary channel RF signals (such as broadcast RF signals), while blocking other RF signals (such as narrowcast RF signals). The CDN would generally amplify and pass secondary channel RF signals (with frequencies over approximately 1 GHz). This alternative system also acted to enhance existing system CATV upstream and downstream capability. CATV upstream capability was enhanced because the CDN can intercept 5-42 MHz upstream signals originating from devices such as household cable modems, and the like that were connected to various local sections of CATV cable, convert these signals to 1 GHz+ signals and transmit them on the on the secondary channel, and block the upstream RF signals from going to the next section of cable, allowing the same upstream RF signal frequencies to be reused on the next section of cable. The net effect was to relieve upstream congestion on the limited 5-42 MHz bandwidth region of the primary channel. The system also enhanced the downstream capability on the primary channel as well, because the CDN could take efficiently encoded secondary channel narrowcast 1 GHz+ digital data, QAM modulate into primary channel RF narrowcast signals as needed, and locally inject these narrowcast signals into the primary channel on an as needed basis. The CDN further prevented the narrowcast primary channel RF signals from crossing past the junctions between different CATV sections of cable (domains), thus allowing each CATV cable domain or section of cable to potentially have its own unique primary channel narrowcast data, and allowing the same RF frequencies to be reused between different sections of cable for different narrowcast channels.

Both applications thus relied on partitioning a standard CATV cable system into a plurality of different local domains or regions of cable, where each region of cable was connected by a junction. Regardless of if the junction is a Coax Fiber Terminal or a Coax Domain Node, the junction(s) semi-isolated the different local domains or regions of cable from each other by selectively knocking out some primary channel local or narrowcast RF signals that are carried at standard CATV frequencies (typically the frequencies under about 1 GHz), thus confining these local or narrowcast RF signals to that particular domain or section of cable prior to the junction. Often at the junctions, the CFT or CDN would then reuse the primary channel RF frequencies previously occupied by these knocked out primary channel narrowcast RF signals (from the previous domain or region of cable), and inject a new a different or alternate downstream narrowcast RF signal (derived from the secondary channel) intended for use by the next domain, region, or section of cable. For upstream signals originating from local (e.g. domain, region, or cable specific devices), the junctions would also transduce or convert these knocked out local upstream signals to the secondary channel, and then block transmission of the primary channel upstream RF signals, thus allowing the same primary channel upstream RF signals to be reused in the next section of CATV cable. The secondary channel would then carry the local upstream data back to the cable head or plant, thus relieving congestion on the rather limited CATV upstream bandwidth as well.

Thus a first section of CATV cable may carry a first narrowcast signal, while the next section of CATV cable might carry an alternate narrowcast signal. These alternate narrowcast signals can either be carried along the coax cables a shadow optical fiber, that roughly follows the same route as the CATV cable (as per application Ser. No. 12/907,970), or by frequencies above 1 GHz (as per application Ser. No. 13/346,709).

In both applications, the primary channel broadcast RF signals (e.g. global RF signals intended to cross between different domains, region, or sections of CATV cable) may often be carried at standard CATV frequencies under about 1 GHz. The junctions are configured to enable these broadcast RF signals to traverse relatively freely between junctions, so that, for example, different sections (domains, regions) of CATV cable would generally carry the same broadcast signal. Thus the junctions must pass some CATV RF signals, and block others.

The present invention is based, in part, on the insight that although various prior art methods, such as lowpass filtering, highpass filtering, or bandpass filtering can be used to terminate the narrowcast RF signal frequencies at the junctions, while allowing the broadcast RF signal frequencies to proceed past the junctions onto the next segment or section of cable, such prior art filtering techniques, although workable, are not fully optimum for these applications. This is because prior art RF signal filtering techniques generally do not have sharp frequency cutoffs, but rather gradually kick in over a range of RF frequencies, and will often require 10 MHz, 20 MHz, or more of bandwidth over which the filtered frequency becomes gradually more and more attenuated. This range of partially attenuated RF frequencies is thus a "no man's land" or "keep away zone" in which RF signals intended to be suppressed continue to exist to a lesser extent, and thus these regions of the RF spectrum must generally be avoided. For example, consider the unused CATV RF frequency regions between about 42 MHz, where CATV upstream RF signals presently stop, and 54 MHz, where CATV downstream RF signals presently begin. The upstream and downstream signals are separated by a prior art bandpass filter. This intermediate region between 42 and 54 MHz is an unused "keep away zone" that wastes about 12 MHz of valuable CATV spectrum. It is workable, and indeed forms the basis of all US CATV systems (European CATV uses the same bandpass filter concept on a different set of frequencies), but it is suboptimum because it wastes bandwidth.

The present invention is also based, in part, on the insight that in cases, such as the previously described systems from Ser. No. 12/907,970 and Ser. No. 13/346,709, where various narrowcast signals are transmitted by a secondary channel (such as the previously discussed optical fiber secondary channels or 1 GHz+ secondary channels), then these various narrowcast signals, or at least the information carried by these various secondary channel narrowcast signals, in addition to being used to inject appropriate narrowcast channels into the various regions, sections, or domains of the CATV cable, can also be used to create a reference signal for adaptive cancelling purposes.

Adaptive canceling methods can be used to very precisely knock out a particular unwanted narrowcast signal, without creating a "keep away zone" or "dead zone". Thus adaptive cancelling methods are ideal for use in the junctions between various sections of CATV cable by devices such as the previously described CFN and CDN devices.

Thus narrowcast signal "x", which is carried by the primary channel, and is wanted in CATV cable section "x" and which is also carried by the secondary channel (possibly in a different format), can be optionally reconstituted to the correct format at the junction, and then used at the junction between CATV cable section "x" and CATV cable section "y" to very precisely prevent the primary channel version of narrowcast signal "x" from penetrating into the primary channel of CATV cable section "y". At the same time, broadcast signals, which will not be adaptively canceled by narrowcast signal "x", can be allowed to freely migrate past the junction and from CATV cable section "x" to CATV section "y".

Because adaptive cancelling methods are precise, these methods avoid the problem of generating 10 MHz, 20 MHz or greater unusable "keep away" bandwidth zones, which would occur when prior art filtering methods are used. Adaptive cancelling methods thus help conserve scarce primary channel CATV bandwidth, thus producing a more efficient enhanced CATV system with greater data carrying capability.

To generalize, in one embodiment, the invention may be a method for using information carried by a secondary channel (e.g. an optical fiber channel, or a 1 GHz+ frequency channel) to prevent a first narrowcast set of RF signals from being transmitted on a primary channel (e.g. the standard CATV cable RF frequency ranges from about 5 MHz to about 1 GHz) from a first segment of a conductive cable (such as CATV cable) to a connected second segment of said conductive cable, while allowing a second broadcast set of RF signals to be transmitted on a primary channel from the first segment of cable to the second segment of cable, where the first segment of cable and the second segment of cable are connected by a junction. The invention's method will generally comprise obtaining a first narrowcast set of information, optionally RF modulating this first narrowcast set of information (this is done if the first narrowcast set of information is not already suitably RF modulated), and transmitting this RF modulated first narrowcast set of information over a first segment of the cable. The method will also modulate or package this first set of information (optionally in a different format) and transmit it over the secondary channel as well.

Usually, there will also be broadcast information, intended to flow freely between cable segments, that can be produced by obtaining a second broadcast set of information, optionally RF modulating this second broadcast set of information (again done if the second broadcast set of information was not already suitably RF modulated), and transmitting this RF modulated second broadcast set of information over the primary channel on the first segment of cable.

Then, according to the invention, at the junction between the cable segments, the method will operate by obtaining the secondary channel modulated first narrowcast set of information, reconstituting it to the correct format as needed, and using this secondary channel modulated first narrowcast set of information to adaptively cancel the RF modulated first narrowcast set of information, thereby preventing the RF modulated first narrowcast set of information from crossing the junction, while permitting the RF modulated second broadcast set of information to cross the junction from said first segment to the second segment of cable. The unwanted narrowcast RF signal is now cleanly knocked out, with need to waste precious primary channel RF bandwidth on "keep away" bandwidth zones.

These adaptive cancelling methods may be used in the previously described Coax Fiber Terminal junctions, Coax Domain Node junctions, other types of junctions, and other types of conductive cable applications, as will be described.

BRIEF DESCRIPTION OF THE DRAWINGS

FIG. 6 shows a block diagram showing various embodiments of the Coax Fiber Terminal device that uses adaptive cancelling methods. In some embodiments, the CFT can be a simple and dumb device that simply splits off all of the upstream data, converts it to an optical signal at various wavelengths, and sends it back along the shadow optical fiber without further processing. In other embodiments, the CFT can be a more sophisticated device that employs a DOCSIS upstream processor to more intelligently separate out upstream signals and also at least partially process the upstream signals.

FIG. 14 shows more details of alternate embodiments of the invention as applied to adaptive cancellation processing of primary channel CATV upstream signals.

FIG. 15C shows some additional examples of adaptive cancellation circuits.

DETAILED DESCRIPTION OF THE INVENTION

Figure 1:
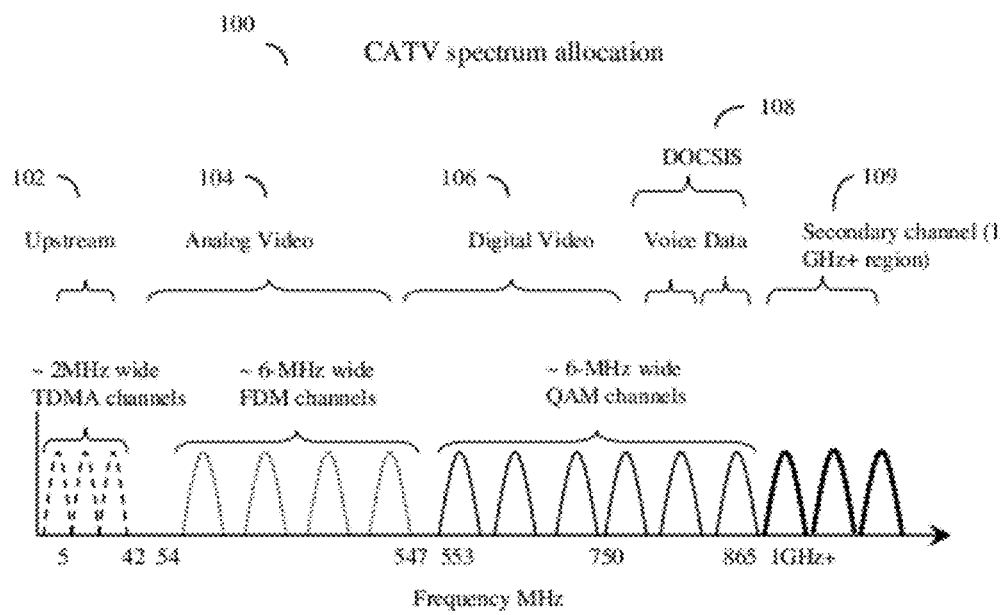
FIG. 1 shows an overall view of the various frequencies and data channels that are presently allocated for a typical CATV cable systems carrying legacy analog television FDM channels, QAM digital television channels, and various types of Data Over Cable Service Interface Specification (DOCSIS) data. The graph also shows the ultrahigh frequency (wideband frequencies) above about 1 GHz, which are presently unallocated for use. Here the primary channel can be considered to be frequencies below about 1 GHz, while the secondary channel can be considered to be frequencies above about 1 GHz.

The invention is particularly useful for extending the data carrying capacity of a primary electrical cable based communications channel, where the primary electrical cable is configured as a plurality of cable segments, and each cable segment is connected to at least one neighbor cable segment by a junction, such as an electrical junction. The basic idea is to efficiently handle congestion on the various cable segments by selectively bringing in, on a local as needed basis, supplemental data derived from a secondary communications channel. Similarly, congestion on the various cable segments may also be improved by selectively removing, on a local as needed basis, data from the primary channel and offloading it to the secondary communications channel. The present invention's adaptive cancellation techniques help add additional precision and selectivity to this data removal and data addition process.

As previously discussed, in some embodiments, the invention may be a method for using information carried by a secondary channel (such as a supplementary optical fiber channel, a higher frequency channel, or other type communications channel) to prevent (or selectively remove) a first narrowcast set of RF signals from being transmitted on a primary channel from a first segment of a conductive cable to a connected second segment of the conductive cable, while allowing (i.e. selectively passing) a second broadcast set of RF signals to be transmitted on a primary channel from the first segment of cable to the second segment of cable, where the first segment of cable and second segment of cable are connected by a junction, such as an electrical junction.

This method will generally comprise obtaining a first narrowcast set of information (e.g. information that is intended to be generally restricted to only certain segments of the conductive cable), optionally RF modulating this first narrowcast set of information and transmitting this RF modulated first narrowcast set of information on the primary channel over a first segment of cable. Here the cable may, of course have a plurality of segments, but here we will be focusing on the events that occur between segments, so we will arbitrarily designate one segment of cable on one side of the junction as a first segment, and we will designate the other segment of cable on the other side of the junction as a second segment.

Note that this RF modulation step is optional, because in some cases, the first narrowcast set of information may have been already suitably RF modulated before it is obtained. However if the first set of information is was not suitably RF modulated at the time it is obtained, then the first narrowcast set of information should be suitably RF modulated, where in this case suitable modulation means suitable for transmission on the primary channel of the cable.

Additionally, the method will also comprise taking this same first narrowcast set of information, and suitably modulating or formatting it so that it is capable of transmission on the secondary channel, and transmitting it on the secondary channel. If the secondary channel is an optical fiber channel, then suitable modulation will mean conversion to optical wavelengths and additionally may comprise formatting the information according to the desired optical data transmission format as well. If the secondary channel is a higher frequency channel on the same conductive cable, then suitably modulating it will mean conversion to higher frequencies, and optional signal reformatting if the secondary channel uses different data transmission waveforms and/or protocols. After suitable modulation the first narrowcast information will be transmitted over the secondary channel. Note that although the primary channel is assumed to be divided into various segments, the secondary channel need not be divided into various segments, but rather can transmit data both upstream and downstream freely past the various junctions.

The invention will also comprise obtaining a second broadcast set of information. Here broadcast set of information means that the information is intended for distribution on the primary channel over substantially all of the various cable segments, or at least over more cable segments than the narrowcast information. This second set of information will, if not already suitably RF modulated, be RF modulated and transmitted over the various cable segments. Here in particular we will focus on the first cable segment.

At the junction between the cable segments, which will generally be an electrically active junction that does some signal processing (to be discussed), the invention will obtain the secondary channel modulated first narrowcast set of information, as needed convert this secondary channel modulated first narrowcast set of information to the same format as the primary channel first narrowcast set of information (e.g. convert to match the match the RF waveforms and frequencies of the primary channel first narrowcast set of information), and use this secondary channel modulated first narrowcast set of information to adaptively and selectively cancel the RF modulated first narrowcast set of information. By contrast the RF modulated second broadcast set of information will not be adaptively cancelled, or otherwise be terminated by any other method as well. The net effect is to selectively prevent the RF modulated first narrowcast primary channel signal or set of information from crossing the junction onto the next segment of cable, while permitting the RF modulated primary channel second broadcast set of information to cross the junction from the first segment of cable to the second segment of cable.

As previously discussed, often the conductive cable may be a CATV cable, and the primary channel may be carried by standard CATV RF frequencies, such as the 5-865 MHz region (in the US), often abbreviated as less than 1 GHz RF signals. Although the invention is also intended for use in other areas, such as Europe, which have somewhat different frequency ranges, here for conciseness, generally just the US (United States) frequency ranges will be used as particular example. However use of US frequencies as examples is not intended to be limiting.

As previously discussed, in some embodiments the secondary channel is carried over optical fiber, such as a shadow optical fiber, and this secondary channel modulation is optical modulation. Alternatively in some embodiments, the secondary channel is carried by RF signals on the conductive cable at different set of frequencies from the primary channel, such as frequencies above approximately 1 GHz. Other types of secondary channels may also be used, and the recitation of specific examples of optical and ultrahigh frequency secondary channels is not intended to be limiting.

Although the invention can be used to simply knock out specific types of data signals on the primary channel, it is most useful when the often congested primary channel RF frequencies that were previously used to carry the knocked out data are then reused or recycled to carry additional data, particularly on an as-needed per cable segment basis, thereby effectively increasing the overall data carrying capacity of the primary channel.

Here, in some embodiments of the invention, the invention's methods will further comprise obtaining a third set of additional data, such as a third replacement narrowcast set of information, secondary channel modulating this third replacement narrowcast set of information, and transmitting this third replacement narrowcast set of information over the secondary channel. At the junction, after adaptive cancelling methods are used to remove the prior (e.g. first) narrowcast set of information, the RF frequencies previously used by the now removed first narrowcast set of information are now empty. These can be now filled with the third replacement set of information, often on an as needed per segment basis, by RF modulating this third replacement narrowcast set of information at the junction, and injecting this RF modulated third replacement narrowcast set replacement of information into the second segment of conductive cable.

More specifically, although the frequencies between the first narrowcast set of information and the third replacement narrowcast set of information do not always have to overlap, often when the first narrowcast set of RF signals is carried on a first set of wavelengths; and the third replacement narrowcast set of RF signals is carried on a third set of wavelengths; there may be some overlap between said the first set of wavelengths and said third set of wavelengths. Thus often at the junction, at least some of the first set of wavelengths used to carry the first narrowcast set of RF signals on the first segment of the conductive cable are replaced by at least some of the third set of wavelengths used to carry the third replacement narrowcast set of RF signals, and the third replacement narrowcast set of RF signals are transmitted over the second segment of conductive cable.

As previously discussed, although the invention's methods will work over a wide range of different types of cable, and with a broad range of secondary channels, in a preferred embodiment, the conductive cable will be a CATV cable, and the second broadcast set of RF signals will often comprise downstream RF signals. In some cases upstream signals can be considered to be carried along the broadcast channel as well, while in other cases upstream signals can be considered to be carried along the narrowcast channel(s).

In some embodiments, a fourth additional upstream set of primary or narrowcast channel upstream RF signals may be added to the second segment of conductive cable (this can be done by, for example data uploaded by various modems and other devices from households connected to this particular segment of cable). At this junction, at least some of this fourth additional upstream set of upstream RF signals can be modulated or packaged for transmission on the secondary channel, and transmitted along the secondary channel. At the junction, adaptive cancelling techniques may then be used to remove at least some of these upstream signals from either the broadcast channel or the narrowcast channel, thereby freeing up these upstream frequencies for reuse on the next section of cable.

FIG. 1 shows an overall view of the various frequencies and data channels presently allocated for CATV (100). Typically the lower frequencies, such as 5-42 MHz (US) or 5-65 MHz (Europe), are allocated for use in transmitting data "upstream" from the individual cable modems back to the Cable Head or Cable plant (102). Typically upstream data is transmitted using a time-share TDMA (Time Division Multiple Access) manner in which MAP data is sent to individual cable modems which allocates certain times on roughly 2 MHz wide QAM channels to transmit data. Starting at around 54 MHz on up to roughly 547 MHz, space was previously allocated for legacy analog video channels (104), which transmit on roughly 6 MHz wide FDM channels. At frequencies above that, frequencies (space, bandwidth) is currently allocated for digital television transmitting on roughly 6 MHz wide QAM channels (106), and above that, space is currently allocated for DOCSIS services (108) that may transmit voice, on-demand video, IP, and other information, again generally as a series of 6 MHz wide QAM channels.

As previously discussed, in some embodiments, the invention's adaptive canceling methods will utilize reference signals obtained from a secondary channel that uses ultrahigh frequency RF signals above about 1 GHz (109).

The CATV cable primary channel (at least using the presently allocated RF frequencies below about 850 to 865 MHz) thus has a finite bandwidth of at most about 100-200 QAM channels. When this bandwidth is used to serve a large amount of different customized types of data to a large amount of different subscribers, this bandwidth quickly becomes exhausted.

Figure 2:
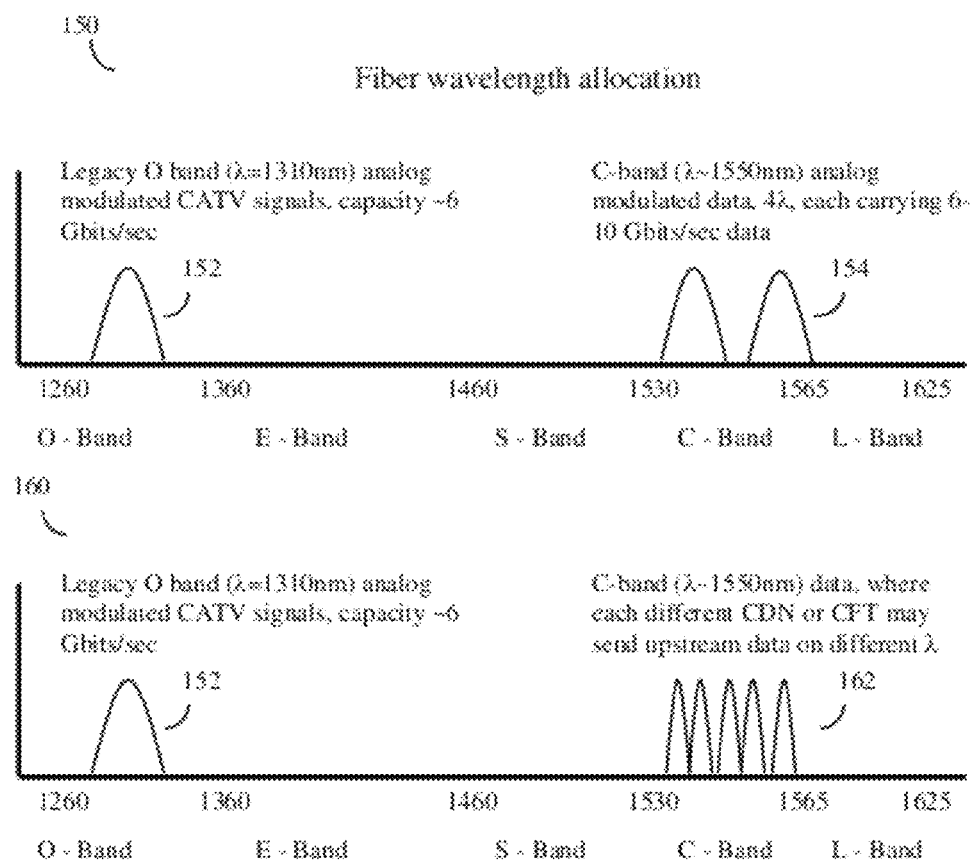
FIG. 2 shows an overall view of the various wavelengths allocated for prior art optical fiber wavelength division multiplexing schemes, as compared to alternative dense wavelength division multiplexing (DWDM) methods, which in some embodiments of the invention may be used by the secondary channel communications pathway network (e.g. the shadow optical fiber) to carry upstream or downstream data.

FIG. 2 shows an overall view of the various optical wavelengths allocated for both prior art optical fiber wavelength division multiplexing schemes, and next generation schemes, and in some embodiments can be used by the shadow optical fiber to carry secondary channel data that can provide reference signals for the invention's adaptive cancelling methods.

Here the optical fiber wavelengths being used at present (150) include a 1310 nm O-band wavelength (152) often used to transmit the various CATV RF channels, such as the various QAM channels, modulated essentially according to the same CATV RF waveforms, but at optical wavelengths according to scheme (120). Supplemental data is often transmitted in the C-band around 1550 nm (154), often on optical wavelengths that, because they are modulated according to non-optimal CATV waveforms, must be separated from each other by a relatively large wavelength separation, and which carry sub-optimal amounts of data per wavelength.

Depending upon the particular embodiment, when shadow fiber node, the secondary channel communications pathway network may transmit upstream data, or backhaul data, according to either prior art methods, or alternatively according to various multiple wavelength or Dense Wavelength Division Multiplexing methods (160). For example, in one simple embodiment, after the various Coax Fiber Nodes in a neighborhood transmit their particular upstream data by the shadow optical fiber, or after the various Coax Domain Nodes in a neighborhood have transmitted their particular upstream data using 1 GHz+ RF signals, at the optical fiber node, the upstream data can then be demodulated, analyzed, and repackaged and retransmitted, possibly using one or more of these different wavelengths.

Here again, a legacy O-band analog signal may be used for upstream communications as desired. Alternatively, multiple wavelengths of more efficiently modulated data signals (such as one of the various optical fiber GigE protocols) may be sent, often as a series of closely spaced wavelengths (162).

Figure 3:
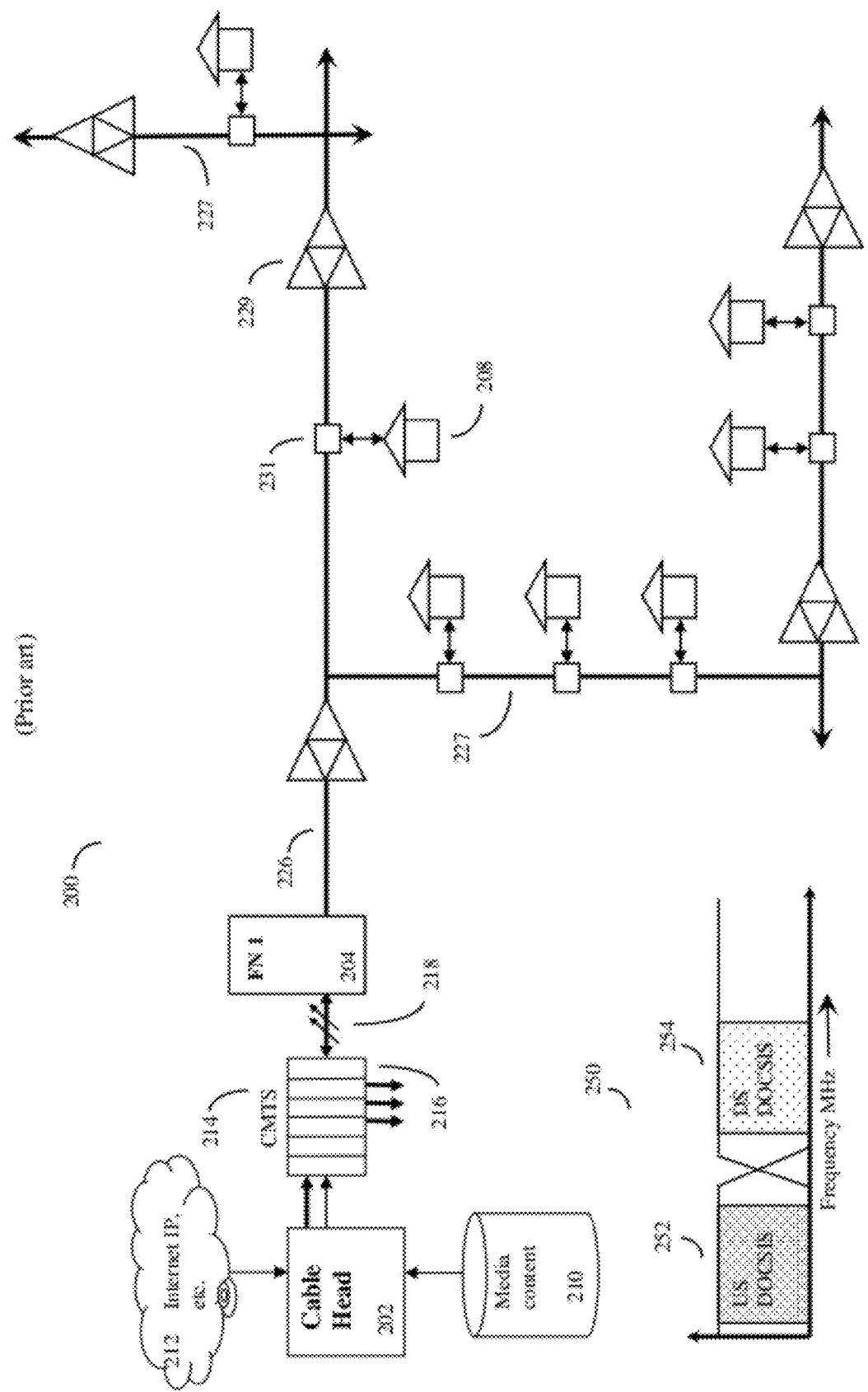
FIG. 3 shows a simplified version of how prior art HFC systems can transmit data from the cable plant or cable head to different optical fiber nodes, each usually connected to a tree and branch like structure of CATV coax cables. The coax cables often contain multiple active devices (e.g. RF amplifiers) often spaced roughly every thousand feet to correct for signal attenuation.

FIG. 3 shows a simplified version of how prior art HFC systems (200) transmit data from the cable plant or cable head end (202) to different optical fiber nodes (204), each usually composed of a tree like trunk (226) and branch (227) structure of CATV cables (226) with active devices, such as RF amplifiers (229), often every thousand feet or so. Each neighborhood will typically consist of up to several hundred or a few thousand different houses, apartments, offices or stores (208) (here referred to generically as "houses"), each equipped with their own cable modems (not shown) and connecting to the CATV cable via a tap (231) Here, for simplicity, only the downstream portion of the HFC system is shown.

The cable head end will obtain standardized media content (210) (such as a standard assortment of analog and digital video channels) from one set of sources, and also obtain more individualized data (212), such as video on demand, IP from the Internet, and other individualized data from other sources. This data is compiled into a large number of different QAM (and at present also FDM) modulated CATV broadcast channels at the CMTS shelf (214). This CMTS (214) will often have a number of different blade-like line cards (216). These line cards transmit the signals by optical fibers (218) to different areas (groups of neighborhoods).

As previously discussed, typical HFC networks actually have a rather complex topology, which here is greatly simplified. Rather than sending one optical fiber from the CMTS to each different neighborhood, typically optical fibers will serve multiple neighborhoods. To do this, the signal from the CMTS side optical fiber (218) will at least usually be split by an optical fiber splitter (not shown) into several different optical sub-fibers, and each sub-fiber in turn will in turn carry the signal to different fiber optic nodes. Here only one Fiber Node, Fiber Node 1 (204) is shown in order to better show the trunk and branch coax cable structure of the neighborhood CATV cable system.

At a fiber node, such as FN 1 (204), the optical signal is converted into a CATV radio frequency (RF) signal and sent via CATV cables (226) to individual cable modems at individual houses (208) in each neighborhood. Typically each neighborhood will consist of between 25 to a few thousand households, served by a CATV cable tree and branch like system of connected cables and active devices such as RF amplifiers (226), (227), and (229) that in turn connects to the local fiber node (204).

The CATV RF spectrum of this prior art HFC system is shown as (250). Here, as previously discussed, at least in the US, the 5-42 MHz frequency region is reserved for upstream signals (252) such as upstream DOCSIS signals (US DOCSIS) going from the households (208) to the cable head (such as the CMTS (214), and the 54-865 MHz frequency region (254) is reserved for downstream signals, such as downstream DOCSIS (DS DOCSIS) going from the cable head to the households (208). Here the US DOCSIS region (252) is drawn as fairly dark (congested with dots) to symbolize the high upstream congestion that occurs when an entire neighborhood of households attempts to send upstream data on this relatively limited region of CATV cable spectrum.

As previously discussed, in one embodiment of the invention, the invention may be a method for using information carried by optical fiber, such as a shadow optical fiber, to prevent a first narrowcast set of RF signals from being transmitted from a first segment of a conductive cable (e.g. CATV cable) to a connected second segment of the conductive cable, while allowing a second broadcast set of RF signals to be transmitted from this first segment to the second segment, where the first segment and the second segment are connected by a junction (usually an electrically active junction). In this embodiment, the method will generally comprise obtaining a first narrowcast set of information, optionally RF modulating said first narrowcast set of information as needed, and transmitting this RF modulated first narrowcast set of information over the first segment of conductive cable.

The method will further comprise optically modulating this first narrowcast set of information, and transmitting this optically modulated first narrowcast set of information over this optical fiber. The method will also comprise obtaining a second broadcast set of information, RF modulating this second broadcast set of information as needed, and transmitting this RF modulated second broadcast set of information over the first segment of cable as well.

Then at the junction, this optically modulated first narrowcast set of information can be retrieved from the secondary channel, and used to adaptively cancel the RF modulated first narrowcast set of information. This prevents the RF modulated first narrowcast set of information from crossing the junction, while permitting the RF modulated second broadcast set of information to cross the junction from the first segment of cable to the second segment of cable.

As before, often this method will also comprise further obtaining and optically modulating a third replacement narrowcast set of information, and also transmitting this third replacement narrowcast set of information over the optical fiber secondary channel. At the junction, this third replacement narrowcast set of information can then be retrieved from the secondary channel, primary channel RF modulated, and injected into the second segment of conductive cable. Here again although RF frequency overlap between the first narrowcast set of information and the third replacement narrowcast set of information is not always required, often there will be RF frequency (or wavelength) overlap. Indeed often the same set of RF frequencies previously used by the first narrowcast channel can then be reused by the replacement narrowcast channel.

In some embodiments, on the cable based primary channel, the narrowcast set of RF signals will be transmitted over higher frequencies than said second broadcast set of RF signals. In these embodiments, the adaptive cancellation process can be further facilitated by using a junction that further comprises a lowpass or bandpass RF filter tuned to selectively pass said second broadcast set of RF signals, and selectively attenuate said first narrowcast set of RF signals. This is described in more detail in FIG. 13.

Alternatively, in other embodiments, the first narrowcast set of RF signals may be transmitted on the cable based primary channel over lower frequencies than the second broadcast set of RF signals. In these embodiments, the adaptive cancellation process can be further facilitated by using a junction that further comprises a highpass or bandpass RF filter tuned to selectively pass the second broadcast set of RF signals, and selectively attenuate the first narrowcast set of RF signals. See again FIG. 13.

As previously discussed, in a preferred embodiment, the conductive cable will be a CATV cable, and the second broadcast set of RF signals may comprise both upstream and downstream RF signals. Alternatively the junctions may be configured to selectively block the upstream channels, thus making them more narrowcast like in nature. In either event, the upstream data carrying capability of the primary channel may be supplemented by selectively removing some upstream data from the primary channel, and putting it on the secondary channel, and/or alternatively adding a fourth additional upstream set of upstream RF signals to the second segment of conductive cable. Here these fourth upstream RF signals may originate from local household devices, such as modems and the like, connected to that particular segment of cable.

Often the invention will be configured so that at the junction(s) the transmission of this fourth additional upstream set of upstream RF signals to the first segment of conductive cable may be blocked at the junction, often by adaptive cancelling methods. In these embodiments, at these junctions, it will often be useful to further optically modulate this fourth additional upstream set of upstream RF signals, and transmit this optically modulated fourth additional upstream set of upstream signals using the optical fiber based secondary channel. This relieves upstream congestion on the cable primary channel, while the secondary channel ensures that the upstream data reaches its intended destination at the cable head or plant.

In alternative embodiments, the junction need not block all of the fourth additional upstream set of RF signals, but rather may pass at least some of these fourth additional upstream set of upstream RF signals to the first segment of conductive cable. So here, some primary channel upstream signals will be localized to their specific segments of cable, while other primary channel upstream signals can be transmitted over a plurality of cable segments.

In these embodiments, according to the invention, it may further be useful to analyze this fourth additional upstream set of upstream RF signals carried by this second segment of conductive cable at the junction, and classify this analyzed fourth additional upstream set of upstream signals into a plurality of upstream DOCSIS channels. This classification information, obtained from at least some of the plurality of upstream DOCSIS channels, can then be used to very precisely adaptively cancel those portions of this fourth additional upstream set of upstream RF signals that carry said at least some of this plurality of upstream DOCSIS channels. In particular, the method may pass a subset of this fourth additional upstream set of upstream RF signals to the first segment of conductive cable. This subset may thus comprise the fourth additional upstream set of upstream RF signals, minus the adaptively canceled portions of the fourth additional upstream set of upstream RF signals that carry said at least some of the plurality of upstream DOCSIS channels. Further, the information previously transmitted by the adaptively canceled portions of the fourth additional upstream set of upstream RF signals that carry said at least some of said plurality of upstream DOCSIS channels may be converted and transmitted upstream using the optical fiber secondary channel. This process is described further in FIG. 14.

Thus to summarize, in a preferred embodiment, the invention's adaptive cancelation methods may be used in an embodiment where the junctions are Coax Fiber Terminals, and the conductive fiber and the optical fiber comprises a hybrid fiber cable (HFC) network with a cable head, at least one trunk optical fiber, at least one trunk optical fiber node terminating on at least one CATV trunk cable. This CATV trunk cable will generally be connected to a plurality of CATV active devices, with at least one branch of CATV cables connected to this plurality of CATV active devices, thus forming a CATV Tree and Branch Network, with a plurality of cable modems or Ethernet terminals connected to this CATV Tree and Branch Network.

In this preferred embodiment, at least one shadow optical fiber may run from the trunk optical fiber to Coax Fiber Terminals associated with at least some of the plurality of CATV active devices. The Coax Fiber Terminals will generally be connected to the CATV cable, and partition the CATV cable into segments using the invention's adaptive canceling methods.

Figure 4:
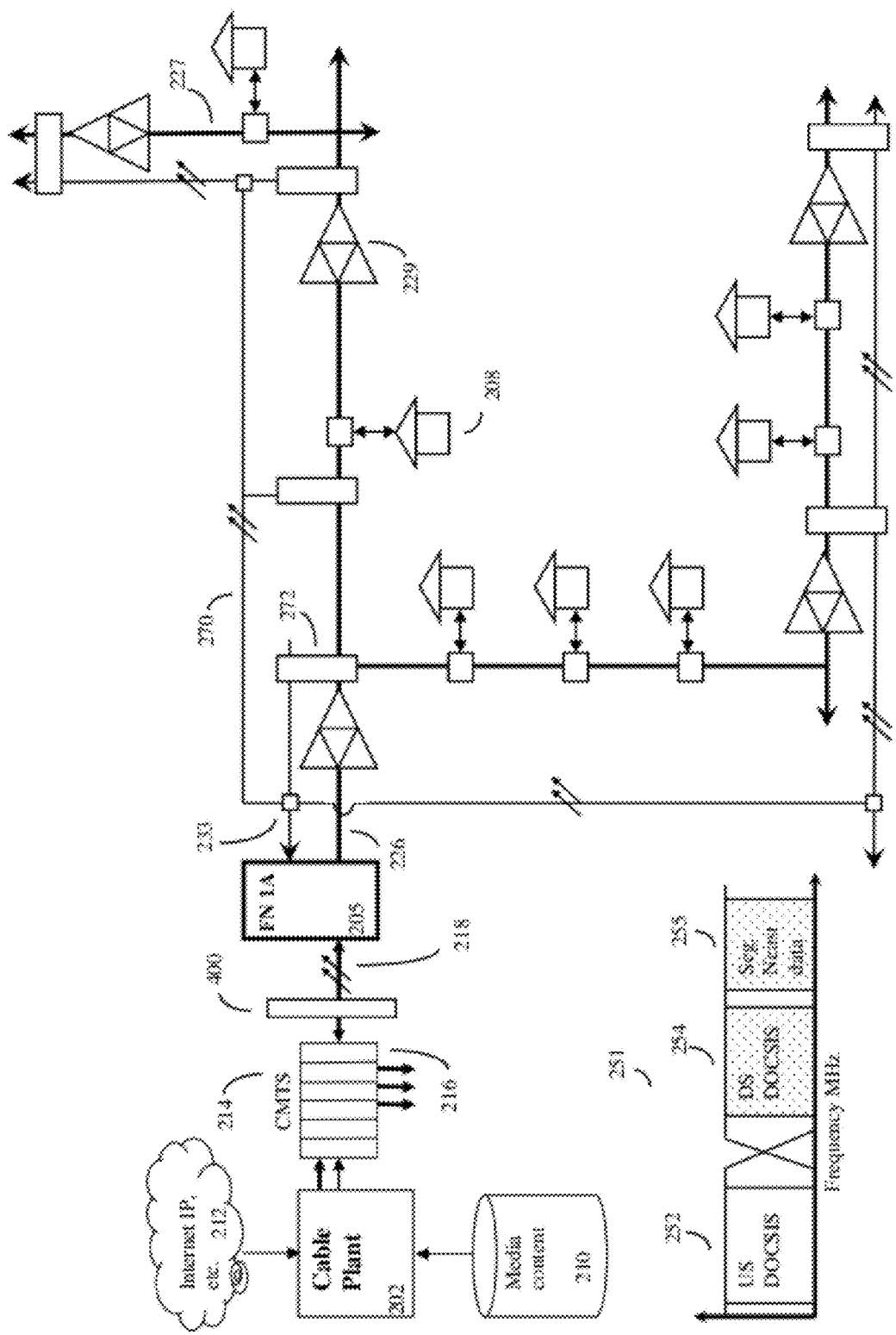
FIG. 4 shows how a "shadow optical fiber" secondary channel can be routed along the same easements, paths and conduits used to carry the neighborhood CATV cable tree and branch coax cables, which act as the primary channel. This shadow optical fiber can, in turn, interact with "Coax Fiber Terminal" devices (CFT). These CFT devices may be positioned on, in, or near the CATV active devices. According to the invention, the CFT devices can use active cancelling methods to remove some of the narrowcast downstream RF channels traveling downstream along the CATV cable primary channel, and replace these narrowcast downstream RF channels with alternate narrowcast downstream RF channels carried by the shadow optical fiber secondary channel. According to the invention, the CFT devices can also use adaptive cancelling methods to remove at least some upstream RF signals traveling back from the various households along the particular CATV branch cable or trunk cable serviced by that particular active device. The CFT devices then can transform at least some of the upstream CATV RF signals and data into upstream secondary channel data (e.g. optical signals), and transmit this data back, using the shadow optical fiber secondary channel, to the optical fiber node and then to the cable head, thus relieving upstream congestion on the neighborhood CATV cable primary channel.

This embodiment is shown in more detail in FIG. 4. FIG. 4 shows how when "shadow optical fiber" (270) is used as the secondary channel, the shadow optical fiber can generally be routed along the same easements, paths and conduits used to carry the neighborhood CATV cable trunk (226) and branches (227). This shadow optical fiber can in turn interact with Coax Fiber Terminals (272) which are devices, usually positioned on, in, or near the CATV active devices (e.g. RF amplifiers 229). These Coax Fiber Terminals can use the invention's adaptive cancelling techniques to remove some or all of the upstream RF signals traveling back from the various households (208) along the particular CATV branch cable (227) or trunk cable (226) serviced by that particular active device (229). The Coax Fiber Terminals (272) can then transform the upstream CATV RF signals and data into upstream optical signals and data, and this can be carried back to the cable head, often by way of modified optical nodes (205) via the HFC system. The Coax Fiber Terminals (272) can also use the invention's adaptive cancelling techniques to use reference signals (typically various narrowcast signals) to adaptively cancel various narrowcast RF frequencies at the Coax Fiber Terminal junctions. Data for a different narrowcast RF signal can then be injected at the Coax Fiber Terminal, and used to serve the next section of CATV cable after the CFT junction.

In some embodiments, these modified optical nodes (205) can, at least in part, be based on CMRTS or D-CMRTS optical nodes as described in copending application Ser. Nos. 12/692, 582 and/or provisional application 61/385,125; the contents of both are incorporated herein by reference.

According to the invention, either prior art optical nodes may be used, and additional devices may be added to intercept upstream data from the shadow optical fiber network (270) and repackage this for transmission back to the cable head, often along optical fiber route (218), often using alternate fibers or alternate wavelengths. Alternatively, the optical node may be modified into a modified optical node (205) with additional components to handle this repackaging internally.

In some embodiments, at the cable head, often just before the CMTS, a decoder apparatus (400) may intercept the optical fiber signals (218) and decode them into a form that can then be recognized by the CMTS. For example, such decoding may be used interpret the CFT domain information into a form that the CMTS can process, and may, for example, make each different Cable Fiber Terminal domain appear to the CMTS as if it is a separate CATV neighborhood. The decoder apparatus may also, in some embodiments, reconstitute upstream data signals coming from the Cable Fiber Terminals by way of MAP data or other methods.

In contrast to the CATV spectrum diagram (250) shown in FIG. 3, the CATV spectrum diagram (251) shown in FIG. 4 is slightly different. In particular, because much or all of the upstream traffic is now going by way of the shadow optical fiber line (270), the upstream bandwidth (252), such as might be used to carry upstream DOCSIS (US DOCSIS) is much less congested, and is thus shown without the dense pattern of dots to symbolize this difference. By contrast, the downstream DOCSIS (DS DOCSIS) (254) or broadcast bandwidth can remain much the same as before, and indeed will often be supplemented by additional cable segment specific narrowcast data delivered by the shadow optical fiber secondary channel (255).

In cases where the shadow optical fiber network secondary channel is a passive optical network, then simple beam splitters can be used (233) to split and combine the various passive optical fibers. This helps lower the cost of the shadow optical fiber network, and allows the capabilities of the shadow optical fiber network to be gradually improved over time by swapping in (and out) more and more capable CFT devices— e.g. on progression may go from "dumb" CFT devices to smarter upstream repackaging CFT devices to GTTH capable CFT devices, all without requiring any changes to the basic local shadow optical fiber network itself.

Alternatively, as previously discussed, the invention may also be a method for using information carried by a an ultrahigh frequency secondary channel that runs over the same section of cable (e.g. 1 GHz+ CATV RF signals) to prevent a first narrowcast set of RF signals from being transmitted on a primary channel (e.g. the less than 1 GHz CATV channel) from a first segment of a conductive cable to a connected second segment of a conductive cable, while allowing a second broadcast set of RF signals to be transmitted on a primary channel from the first segment to the second segment, this first segment of cable and the second segment of cable again being connected by a junction. As before, this method will generally comprise obtaining a first narrowcast set of information, optionally primary channel RF modulating this first narrowcast set of information as needed, and transmitting this RF modulated first narrowcast set of information over the first cable segment on the primary channel. The method will also comprise secondary channel modulating or packaging this first narrowcast set of information, and transmitting this secondary channel modulated first narrowcast set of information over the secondary channel as well. The method will also usually comprise further obtaining a second broadcast set of information, optionally primary channel RF modulating this second broadcast set of information as needed, and transmitting this RF modulated second broadcast set of information over the first segment of cable on the primary channel.

As before, at the junction, the method will further comprise obtaining or retrieving the secondary channel modulated first narrowcast set of information, optionally converting it or reformatting it to match the RF frequencies and waveforms as the primary channel modulated first narrowcast set of information, and using this secondary channel modulated first narrowcast set of information to adaptively cancel the RF modulated primary channel first narrowcast set of information, thereby preventing the RF modulated primary channel first narrowcast set of information from crossing the junction, while permitting the RF modulated primary channel second broadcast set of information to cross the junction from the first segment to the second segment.

However, as previously discussed, in this alternative embodiment, the secondary channel will be carried by RF signals on the conductive cable that are substantially different from the frequencies used for the primary channel, which will typically be frequencies below approximately 1 GHz, such as 5-865 MHz. By contrast, these secondary channel frequencies may comprise frequencies above approximately 1 GHz. In this embodiment, the first narrowcast set of information and said broadcast set of information are also carried by RF signals on the primary channel of said conductive cable at frequencies below approximately 1 GHz.

With the exception that in this later embodiment, the secondary channel is carried on the same cable sections as the primary channel (but at higher frequencies), the other details of the various embodiments are otherwise very similar to the previously discussed embodiment where the secondary channel is provided by a shadow optical fiber. Thus for conciseness, these various optical fiber based embodiments will not be repeated for the case where the secondary channel is a higher frequency cable channel, since with the exception of the different secondary channel, they are otherwise substantially identical to the previously discussed embodiments.

Figure 5:
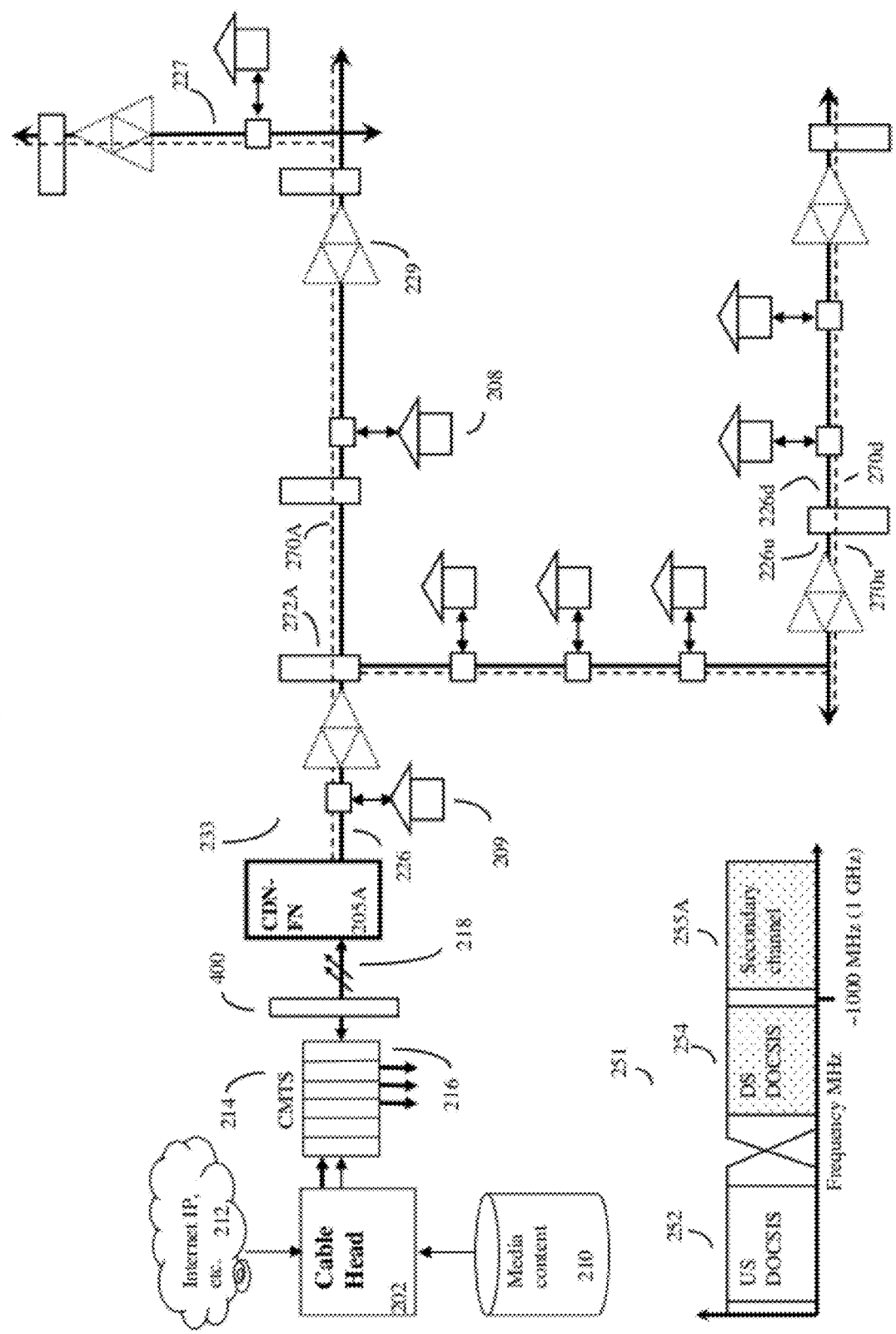
FIG. 5 shows an example of an alternate type of secondary channel, based on high (e.g. 1 GHz+ RF frequency) signals carried by the same physical sections of CATV cable as the primary channel. Here "Coax Domain Node" devices (CDN) are placed in the junctions between the various sections, regions, or domains of CATV cable. According to the invention, the CDN can use active cancelling methods (using narrowcast reference signals obtained from the 1 GHz+ frequency secondary channel) to remove some of the narrowcast downstream RF channels traveling downstream along the primary channel, and replace these narrowcast downstream RF channels with alternate narrowcast downstream RF channels obtained from the 1 GHz+ secondary channel. According to the invention, the CDN devices can also use adaptive cancelling methods to remove at least some upstream RF signals traveling back along the primary channel from the various households along the particular CATV branch cable or trunk cable serviced by that particular active device. The CDN devices then can transform at least some of the upstream primary channel CATV RF signals and data into upstream secondary channel date (e.g. 1 GHz plus signals), and transmit this data back to the optical fiber node and then to the cable head, thus also relieving upstream congestion on the neighborhood CATV cable primary channel.

FIG. 5 shows this alternate embodiment in which the secondary channel used for adaptive cancelling purposes is instead carried by 1 GHz RF signals, symbolized by the dashed line (270A), which runs at 1 GH+ frequencies (255A) along exactly the same cable as the neighborhood CATV cable trunk and branches that carry the CATV signals from 5 to 865 MHz. (226), (227). This secondary channel runs on CATV coax cable which in turn passes through various Coax Domain Nodes (272A). Note how the dashed lines from the 1 GHz+ wideband communications pathway are shown passing through the Coax Domain Nodes, while the darker solid line (226, 227) symbolizing 5-865 MHz (e.g. less than 1 GHz) are shown as being terminated at the various Coax Domain Nodes as a reminder of the signal handling features of the Coax Domain Nodes.

In FIG. 5 and some subsequent figures, the portion of the CATV cable facing the optical fiber node and the head end of the cable will generally be designated as (226*u*) and (270*u*), and the portion of the CATV cable facing away from the optical fiber node, and away from the head end of the cable will generally be designated as (226*d*) and (270*d*). Here again, (226) represents the primary channel CATV RF signals under about 1 GHz, while 270A represents the secondary channel RF signals above about 1 GHz.

When a legacy section of CATV cable is upgraded, these Coax Domain Nodes may often be positioned to replace legacy CATV active devices (e.g. RF amplifiers 229). These legacy active devices (229) are thus shown in dotted lines to indicate that they may be replaced.

The Coax Domain Nodes are often configured to use the invention's adaptive cancelling methods to remove some or all of the upstream RF signals (e.g. 5-42 MHz signals) traveling back from the various households (208) along the particular CATV branch cable (227) or trunk cable (226) serviced by that particular active device (229), but are often configured to freely pass the 1 GHz+ frequency RF signals. Thus FIG. 5 shows the low frequency portion of the coax cable (226, 227) stopping at each Coax Domain Node (272A), while the 1 GHz+ wideband frequencies (270A) are shown as passing through each Coax Domain Node (272A).

The Coax Domain Nodes (272A) will often then transform at least some of the 5-42 MHz upstream CATV RF signals and data into 1 GHz+ upstream RF signals and data, and this can be carried back to the cable head, often by way of modified optical nodes (205A) via the HFC system.

Various channels of narrowcast data can also be transmitted at 1 GHz+ frequencies along the secondary channel (270A). The Coax Domain Nodes (272A) can thus, for example use a particular secondary channel 1 GHz+ narrowcast channel as a reference channel, and according to the invention's adaptive cancelling methods use this reference channel to block transmission (on the primary channel) of that particular narrowcast channel along a particular section of cable. At the same time, the CDN can take a different 1 narrowcast channel being carried at 1 GHz+ frequencies on the secondary channel, convert it to the primary channel frequencies, and inject it into the next section of cable. As a result, each section of cable between the various CDN (272A) can have their own unique narrowcast channels along the primary channel, thus increasing the overall primary channel downstream data capacity of the CATV system.

In some embodiments, these CDN-fiber nodes, or CDN-FN (205A) can, at least in part, be based on concepts first discussed in the CMRTS or D-CMRTS optical nodes as described in copending application Ser. Nos. 12/692,582 and/or provisional application 61/385,125; the contents of both are incorporated herein by reference.

According to the invention, either prior art optical nodes may be used, and additional CDN devices may be added to intercept upstream data from the secondary channel (270A) and repackage this for transmission back to the cable head, often along optical fiber route (218), often using alternate fibers or alternate wavelengths. Alternatively, the optical node may be modified into a modified optical node with additional CDN functionality (205A) with additional components to handle this repackaging internally.

In some embodiments, at the cable head, often just before the CMTS, a decoder apparatus (400) may intercept the optical fiber signals (218) and decode them into a form that can then be recognized by the CMTS. For example, such decoding may be used interpret the CDN domain information into a form that the CMTS can process, and may, for example, make each different Coax Domain Node domain appear to the CMTS as if it is a separate CATV neighborhood. The decoder apparatus may also, in some embodiments, reconstitute upstream data signals coming from the Coax Domain Nodes by way of MAP data or other methods.

In contrast to the CATV spectrum diagram (250) shown in FIG. 3, the CATV spectrum diagram (251) shown in FIG. 5 is also slightly different. In particular, because much or all of the upstream traffic is now going by way of the secondary communications channel (270A), the upstream bandwidth (252), such as might be used to carry upstream DOCSIS (US DOCSIS) or other upstream signals is again much less congested, and is thus shown without the dense pattern of dots to symbolize this difference. By contrast, the downstream DOCSIS (DS DOCSIS) (245) bandwidth can remain much the same as before, and indeed can be supplemented by additional narrowcast channels. Note that for this scheme, the frequencies above about 1 GHz are occupied by the secondary channel (255A).

FIG. 6 shows a block diagram of various embodiments of the Coax Fiber Terminal (272), along with some details of the Coax Fiber Terminal's optional DOCSIS upstream processor and the Coax Fiber Terminal's optional Gigabit To The Home (or GigE To The Home) (GTTH) processor.

In its simplest form, a "dumb" Coax Fiber terminal can consist of little more than a adaptive canceller device that implements at least one version of the invention's adaptive cancelling methods (described in more detail in FIGS. 8 to 13) (500) coupled to a simple electrical to optical converter (502). For example, one embodiment may pass all upstream signals through to the shadow optical filter, often at a wavelength unique to that particular Coax Fiber Terminal (272). However in alternate embodiments, the direct electrical to optical converter (502) may be omitted, and instead the filtered upstream RF signals may be digitized and then further processed by a DOCSIS upstream processor (DOCSIS US Processor) (504).

This DOCSIS upstream processor may comprise, for example, a high speed A/D tuner, (506) a tuner bank (or software version of a tuner bank) for tuning into specific upstream frequencies (508), a demodulator such as a high speed processor or Digital Signal Processor (DSP) (510) to either extract the data from these frequencies, and/or repackage the data into an alternate form for transmission over the shadow optical fiber (270), and at least one electrical to optical converter (512). As will be discussed, in some embodiments, the demodulation process may be facilitated by informing the demodulator of the Mini-slot Allocation Packet (MAP) data associated with the various cable modems handled by the Coax Fiber Terminal (514).

In other embodiments, as previously discussed, the Coax Fiber Terminal may additionally be used as a convenient location from which to inject narrowcast CATV signals, which propagate over the CATV cable between different CFT. In these alternative embodiments, the Coax Fiber Terminal may additionally comprise an optional secondary channel downstream processor (520). This optional secondary channel downstream processor may comprise MAC and PHY units (522) which receive downstream data from the shadow optical fiber (270), and in turn send it to a suitable RF transmitter (524) which may generate suitable narrowcast RF signals.

Figure 7:
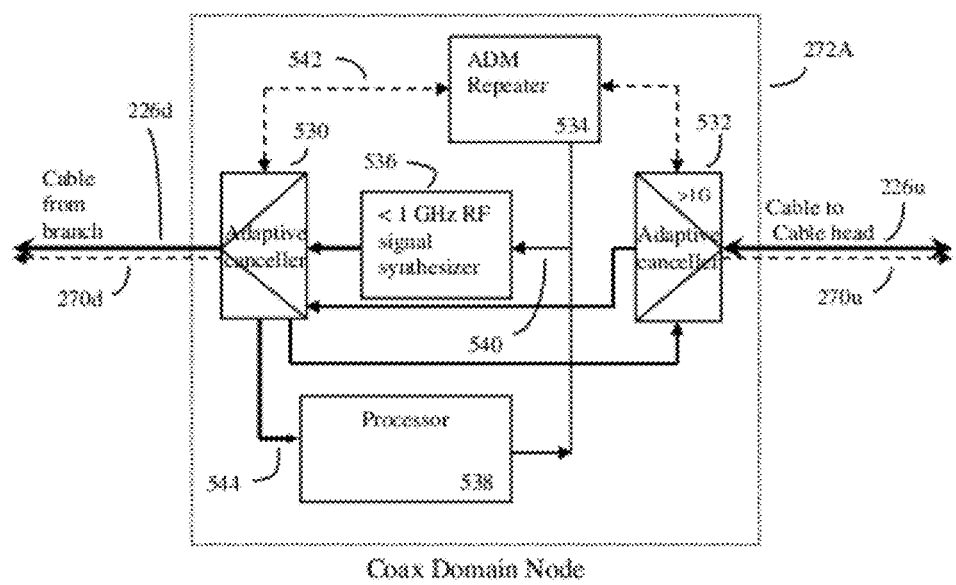
FIG. 7 shows a block diagram showing various embodiments of a Coax Domain Node device that uses adaptive cancelling methods.

FIG. 7 shows a diagram of the Coax Domain Node(s) (272A). These nodes, which also generally interrupt the CATV coax cable (226, 270) at various intervals (e.g. are junctions in the CATV cable based tree and branch network), perform a number of functions. On the CATV cable facing the downstream portions of the cable (226d, 270d—the cable branch, away from the cable head and the fiber node), there will often be at least one device (530) that implements one or more of the invention's adaptive cancelling methods (shown in more detail in FIGS. 8-13). In some embodiments, there may also be a second device (532) that implements the invention's adaptive canceling methods as well, often located at the upstream (226u, 270u—facing the cable head and the fiber node) portion of the Cable Domain Node. Broadcast signals from the cable head may be routed directly from adaptive canceller (532) to (530) without any cancellation process and passed along downstream without interference. Narrowcast signals may be processed by device (534), which may be an add drop multiplexer (ADM) repeater, and those narrowcast signals intended for transmission on the lower frequency range (e.g. 5-865 MHz) (540) are sent to the RF synthesizer (536) and then sent downstream.

Finally, low frequency upstream signals (e.g. 5-42 MHz region), (544) often sent by various households connected to the domain controlled by that particular Coax Domain Node may be processed by processor (538), sent to ADM repeater (534), where they can be converted to 1 GHz+ RF signals and sent back upstream in the direction of the fiber node (205) and the cable head end. The adaptive cancellers can then cancel these particular upstream signals, so that on the next section of cable, these upstream frequencies are now clear, and these frequencies can thus be used again by other devices (e.g. household modems) connected to the next section of cable, thus increasing the overall upstream data carrying capacity of the CATV system.

The ADM repeater essentially manages RF signal traffic on the 1 GHz+ secondary channel. This unit both merges new data in the form of new 1 GHz+ signals onto the 1 GHz+ secondary channel (270A), and also intelligently (i.e. usually under microprocessor or microcontroller control) extracts the relevant narrowcast data from the 1 GHz+ wideband frequencies (270A) for subsequent retransmission on the primary channel, and or for use as a reference signal for adaptive cancellation purposes.

The various Cable Domain Nodes (272A) (and for that matter the Coax Fiber Nodes (270) as well) will often have at least one and often more than one of their components (e.g. 534, 536, 538) and adaptive cancellation units (530, 532) run under the software control of one or more microprocessors/ microcontrollers (not shown), so that their characteristics may be remotely adjusted by commands sent from the cable head end, or from the CDN-Fiber Node, or from other Coax Domain Nodes (e.g. a request for an additional channel) as desired. The CDN-Fiber node (205) will also similarly be adjustable under software control, and can often also accept remote commands.

In some embodiments, to improve data handling capability still further, it may be useful to extract the underling digital data from the various cable RF waveforms, and repackage this underlying digital data into a more efficient format. To do this, the various devices (205A), (272A) may be further given the capability to do this type of intelligent data extraction and repackaging, as well as conversion back to the various cable RF waveforms as needed.

The invention's adaptive cancelling methods can operate in a variety of modes or ways to prevent at least some RF signals from crossing the junction between a first section, segment, or domain of cable, and the next section, segment, or domain of cable. Here, these various modes or ways are described in more detail in FIGS. 8 to 13.

Figure 8:
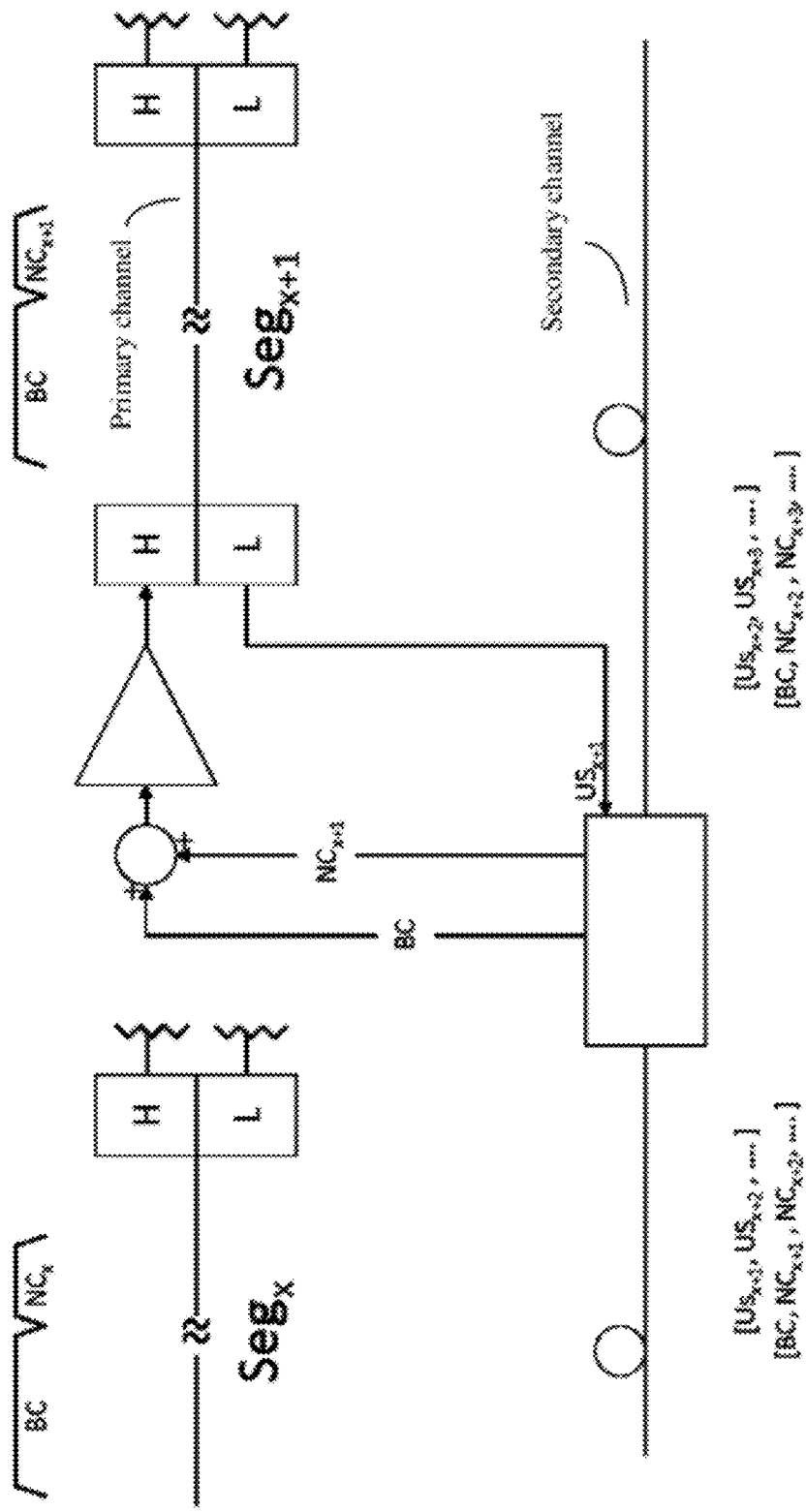
FIG. 8 shows a first and most trivial type of signal separation method, in which the junction simply acts like a physical break in the cable.

FIG. 8 shows the first and most trivial type of signal separation method, in which the junction simply acts like a physical break in the cable. In this rather trivial implementation, at each junction, the CFN or CDN or other junction device simply terminates the primary channel, and sends a signal derived entirely from the secondary channel to the next section of cable. Here there is no adaptive cancellation at all.

Figure 9:
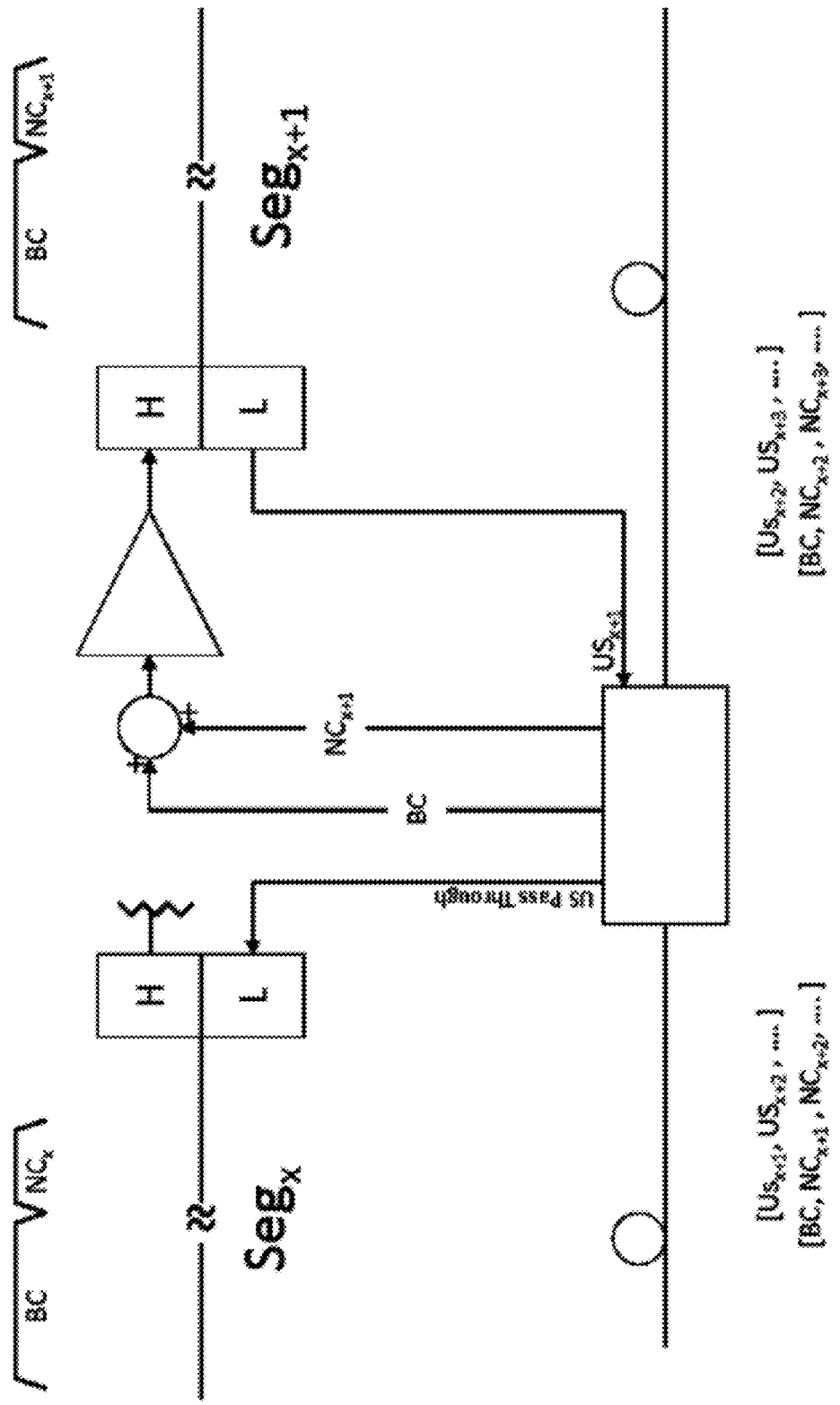
FIG. 9 shows a second type of signal separation method, in which the downstream portion of the primary channel is again isolated from one section of cable to the next (here prior art methods such as bandpass filters may be used), but the upstream data is not isolated.

FIG. 9 shows a second type of signal separation method, in which the downstream portion of the primary channel is again isolated from one section of cable to the next (here prior art methods such as bandpass filters may be used), but the upstream data is not isolated.

Figure 10:
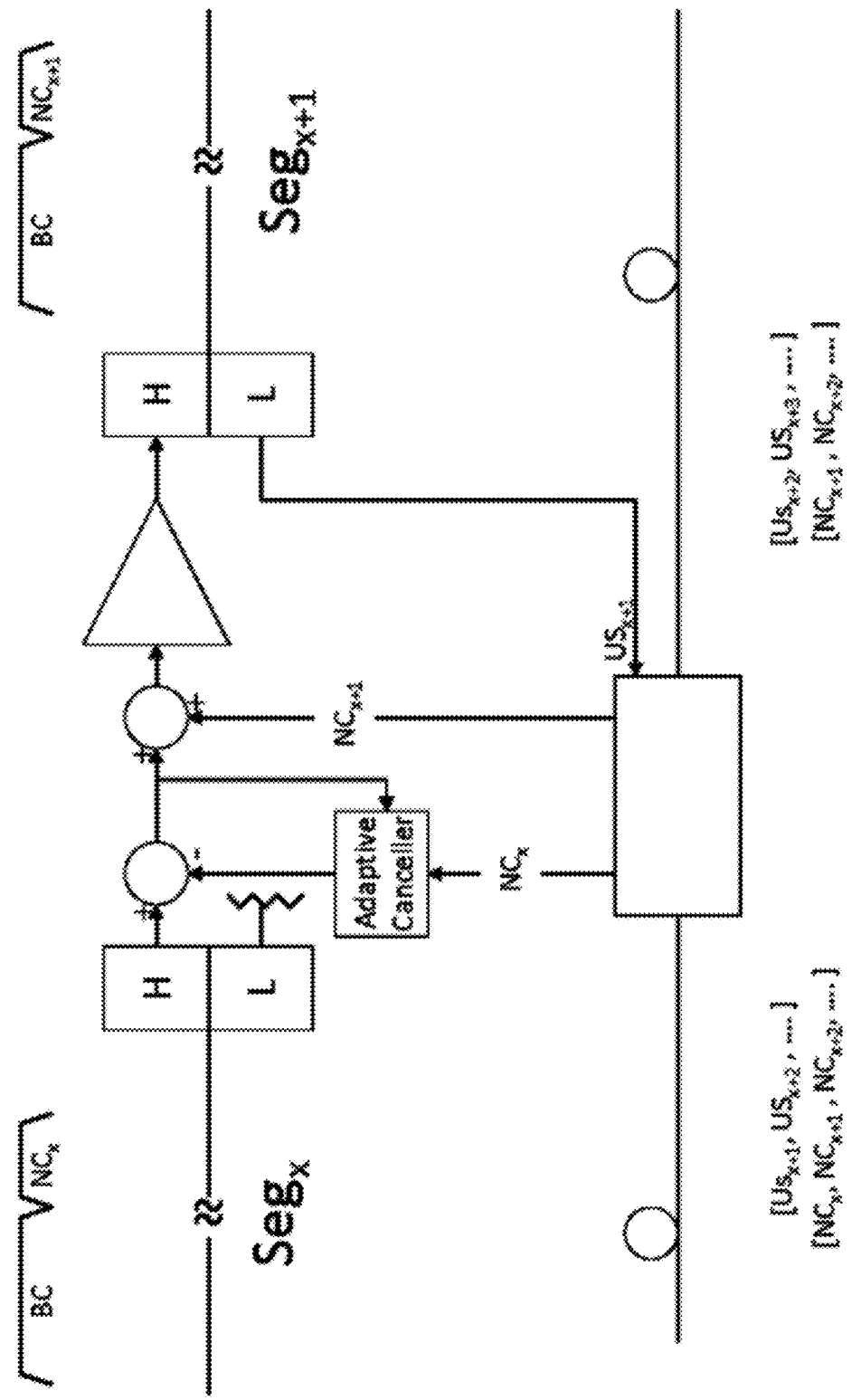
FIG. 10 shows a third type of signal separation method, in which here the upstream portion of the primary channel is isolated from one section of cable to the next (here prior art methods such as bandpass filters may be used). In the third mode, however, the invention's adaptive cancellation methods are now used to adaptively cancel some of the primary channel narrowcast data from that particular section of cable, while still allowing the primary channel broadcast data to cross the junction from the first section of cable to the second section of cable.

FIG. 10 shows a third type of signal separation method, in which here the upstream portion of the primary channel is isolated from one section of cable to the next (here prior art methods such as bandpass filters may be used). In the third mode, however, the invention's adaptive cancellation methods are now used to adaptively cancel some of the primary channel narrowcast data from that particular section of cable, while still allowing the primary channel broadcast data to cross the junction from the first section of cable to the second section of cable. Here assume that a first narrowcast signal was previously injected into the first segment of cable, $Seg_x$, at the previous junction. For this adaptive cancellation to work, the adaptive canceller will obtain a reference version of the first narrowcast signal from the secondary channel, and use this reference version to specifically cancel out that first narrowcast signal, while allowing the broadcast signal to pass through the junction and on to the next section of cable. At the junction, a second narrowcast signal may also be injected, often using the same or similar frequencies as the first extracted narrowcast signal, so that the second segment of cable, $Seg_{x+1}$, can be served by both the broadcast signal and a second narrowcast signal.

Figure 11:
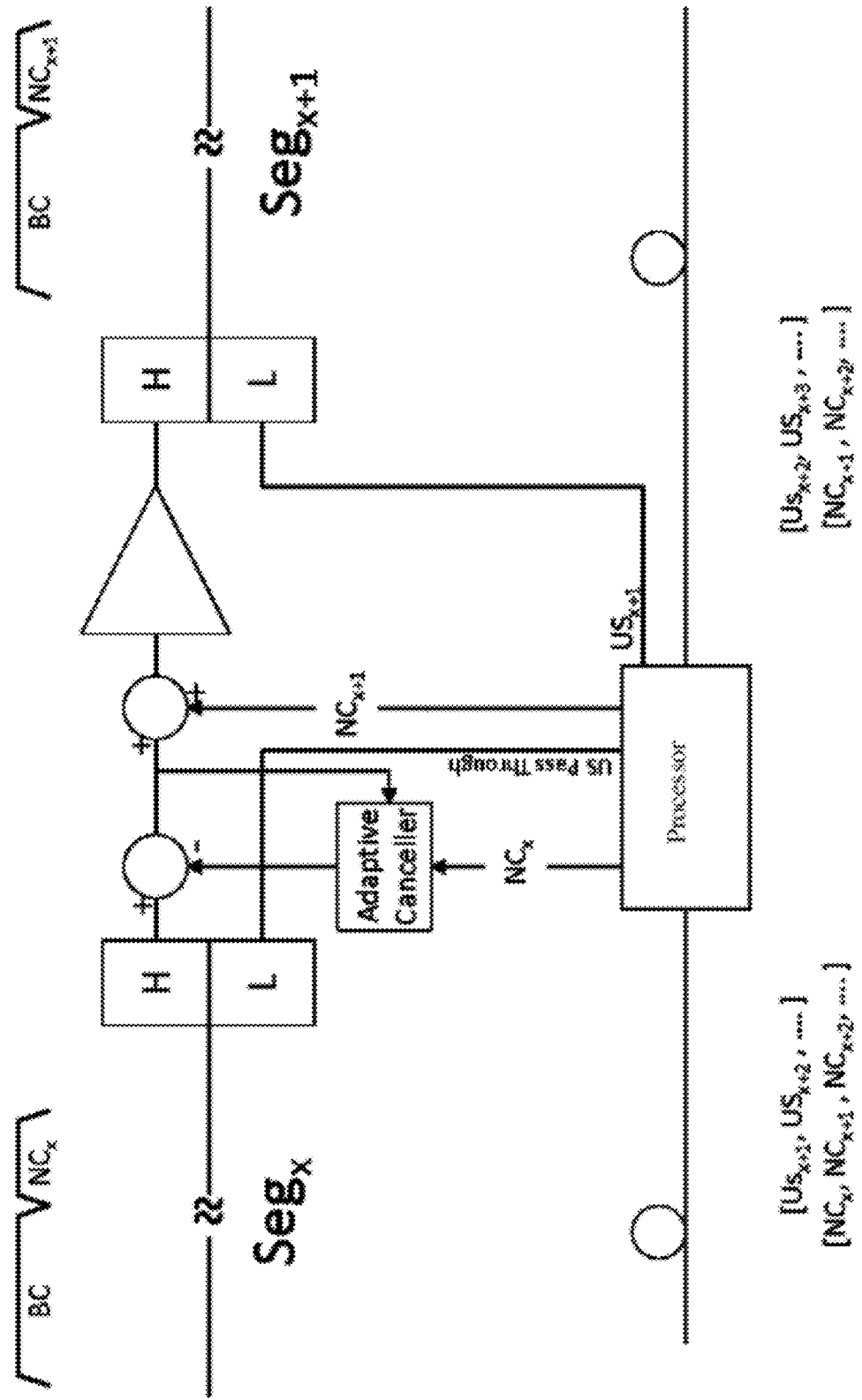
FIG. 11 shows a fourth type of signal separation method, in which adaptive cancellation methods are used to adaptively cancel some of the primary channel downstream narrowcast data from that particular section of cable, while still allowing the primary channel downstream broadcast data to cross the junction from the first section of cable to the second section of cable.

FIG. 11 shows a fourth type of signal separation method, in which adaptive cancellation methods are used to adaptively cancel some of the primary channel downstream narrowcast data from that particular section of cable, while still allowing the primary channel downstream broadcast data to cross the junction from the first section of cable to the second section of cable. At the same time, in this fourth mode, some of the primary channel upstream data from the previous section of cable is routed through the secondary channel, while some of the upstream data is now passed through from one section of cable (e.g. $Seg_{x+1}$) to another section of cable (e.g. $Seg_x$). Here the processor may either simply regenerate some of the passed through upstream data, or alternatively adaptive cancelling methods may be used to terminate some of the upstream data.

Figure 12:
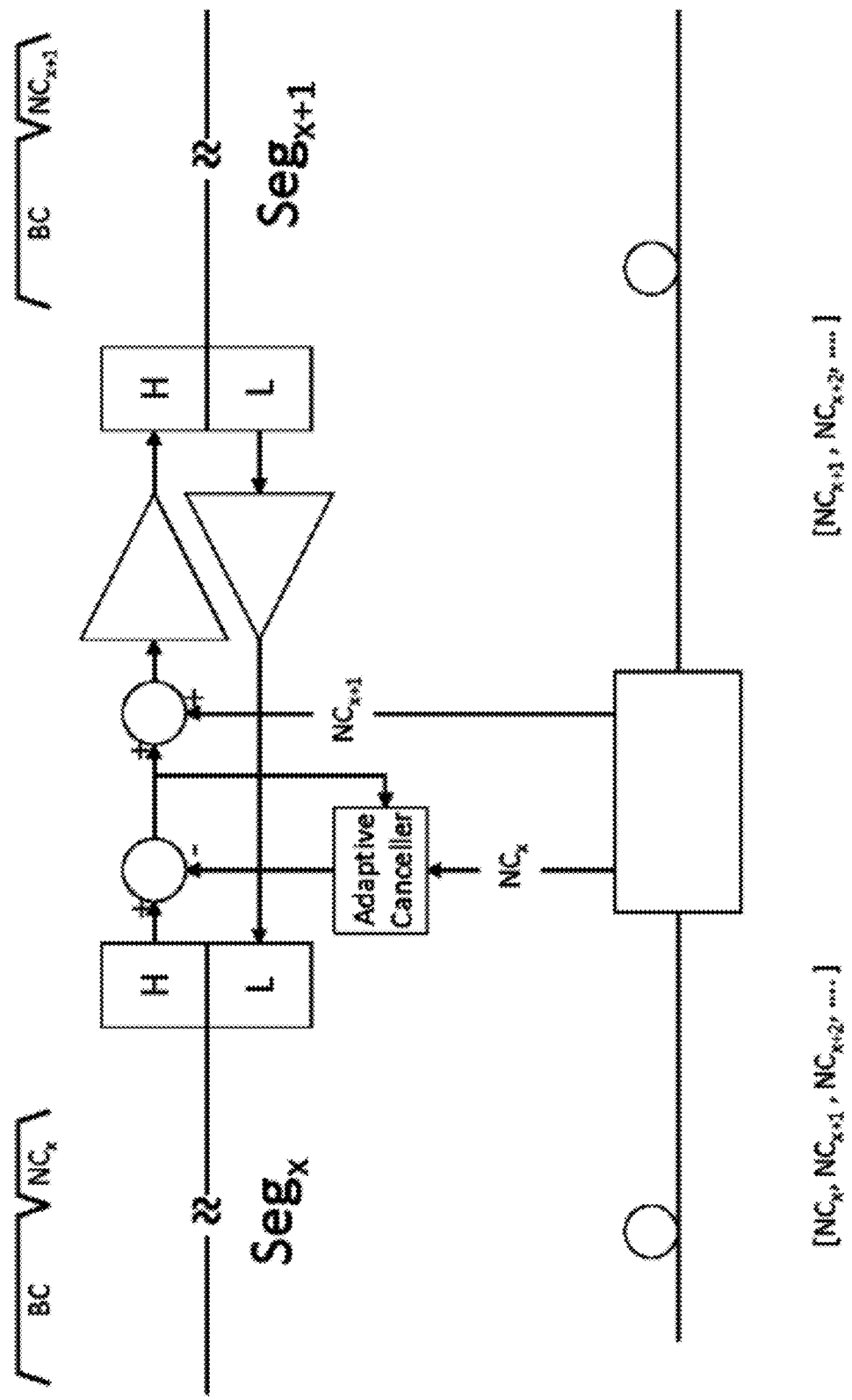
FIG. 12 shows a fifth type of signal separation method, in which again adaptive cancellation methods are used to adaptively cancel some of the primary channel downstream narrowcast data from that particular section of cable, while still allowing the primary channel downstream broadcast data to cross the junction from the first section of cable to the second section of cable.

FIG. 12 shows a fifth type of signal separation method, in which again adaptive cancellation methods are used to adaptively cancel some of the primary channel downstream narrowcast data from that particular section of cable, while still allowing the primary channel downstream broadcast data to cross the junction from the first section of cable to the second section of cable. In this fifth type of signal separation method, however, the upstream data just passes through the junction from one section of cable to the other section of cable unimpeded.

Figure 13:
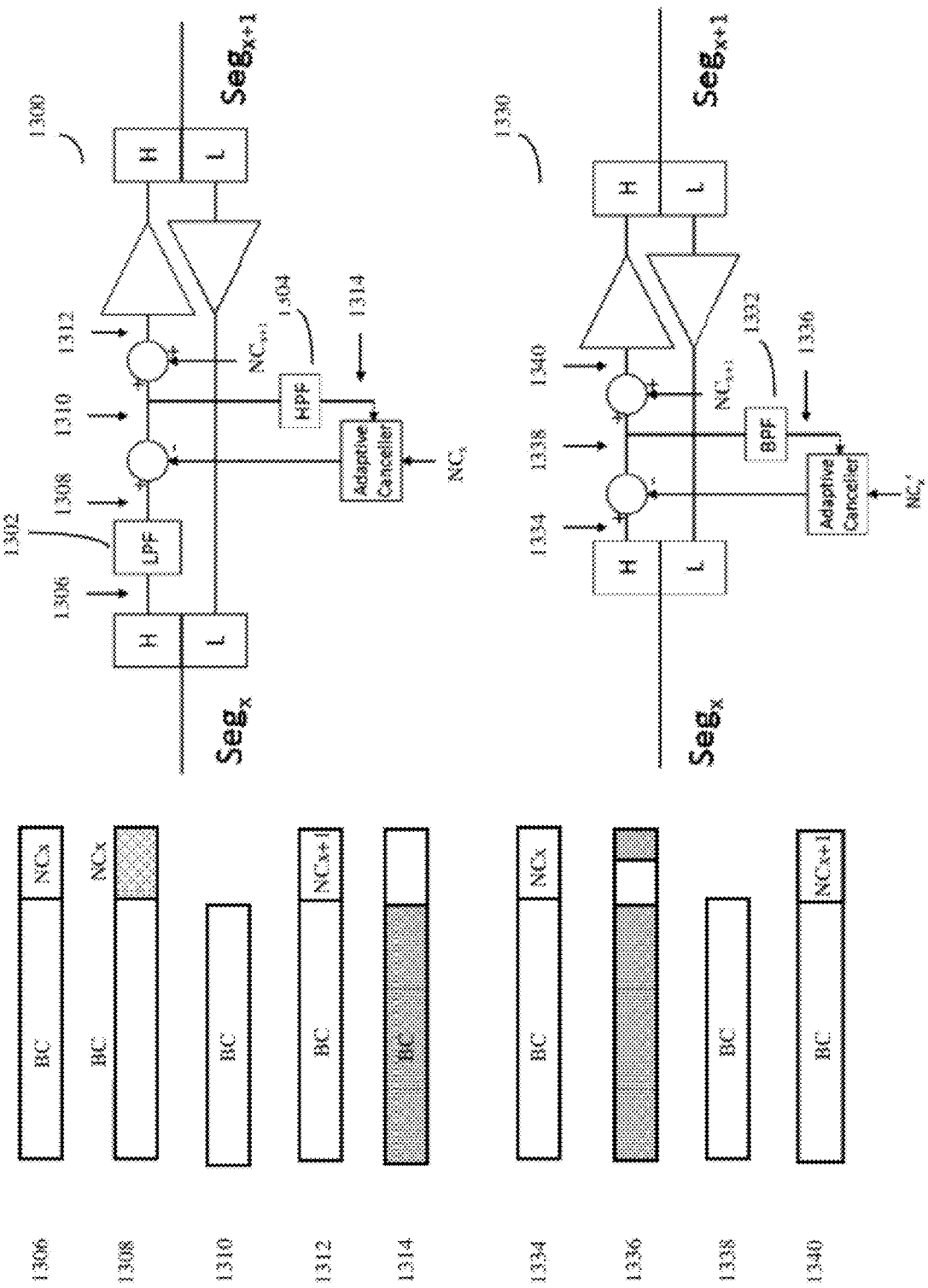
FIG. 13 shows how bandpass filters or narrow pass filters can be used to further facilitate the adaptive cancelling process.

In some embodiments of the invention, bandpass or narrow pass filters can be used to further facilitate the adaptive cancelling process. Some of these embodiments are shown in FIG. 13.

In (1300), there is a low pass RF filter (1302) and a high pass filter (1304) that assist in the adaptive cancellation process. The primary channel downstream higher frequency signals from the previous segment of cable, $Seg_x$ which before the lowpass filter (1302) contained both the lower frequency broadcast signals (BC) and the higher frequency narrowcast signals $NC_x$ (1306) now, after the low pass filter (1302) contain primarily the lower frequency broadcast signals (BC) (1308), and the narrowcast signal $NC_x$ at reduced intensity. The reduced intensity of the narrowcast signal $NC_x$, makes it easier for the adaptive canceller to completely remove the residual narrowcast signals $NC_x$, resulting in a signal that contains only the downstream broadcast signals (1310). At the same time, because the lowpass filter (1302) does not have to be 100% efficient, the "keep away" zone of this less than 100% efficient lowpass filter is much narrower than prior art lowpass filters that had to operate with much higher efficiency, thus allowing more of the scarce CATV primary spectrum to be efficiently utilized.

After the narrowcast signals $NC_x$ from the previous segment of CATV are removed by this combination lowpass filter (1302) and adaptive canceller, new narrowcast signals $NC_{x+1}$ intended for downstream transmission on the next segment of cable, $Seg_{x+1}$ can then be extracted from the secondary channel (not shown) and then added, as is shown in (1312).

As a further optional step to improve the efficiency of the adaptive cancelling process, optional highpass filter (1304) may block the broadcast signals, and pass any residual narrowcast signals $NC_x$ that might otherwise escape the adaptive cancellation process back to the adaptive canceller. This further insures that the narrowcast signals $NC_x$ are totally removed, prior to the addition of the next segment downstream primary channel narrowcast signals $NC_{x+1}$.

Alternatively (1330), a bandpass filter (1332) may be used to assist the adaptive canceller to suppress primary channel downstream narrowcast signals $NC_x$ from penetrating pass the previous segment of cable, $Seg_x$, to the next section of cable $Seg_{x+1}$. Here, primary channel downstream signals containing both lower frequency broadcast signals BC and higher frequency narrowcast signals $NC_x$ from segment $Seg_x$ (1334) have the narrowcast portion adaptively canceled using reference signals $NC_x$ derived from the secondary channel (not shown). Any residual narrowcast signals $NC_x$ are passed through the bandpass filter (1332), which here passes the most problematic portion of the spectrum, which are those narrowcast signals $NC_x$ that are closest in frequency to the lower frequency broadcast signals BC (1336). This region of the spectrum is fed back to the adaptive canceller, thus again ensuring that only the broadcast region BC of the primary channel downstream signal spectrum is passed along (1338). Then, as before, new narrowcast signals $NC_{x+1}$ intended for downstream transmission on the next segment of cable, $Seg_{x+1}$ can then be extracted from the secondary channel (not shown) and then added, as is shown in (1340).

FIG. 14 shows more details of alternate embodiments of the invention as applied to adaptive cancellation processing of primary channel CATV upstream signals. In the lower portion of FIG. 14 (1400), the primary channel upstream signals from the previous section of cable are peeled off or copied and then converted and transferred to the secondary channel, where the upstream channels may then be "backhauled" or sent back to the CATV cable head or plant via the secondary channel. The upstream channels may then be sent through a filter, at least some of the upstream channels removed, and then new upstream channels from the next segment of cable are then injected, where they are then carried by the primary channel until the next junction (where these new upstream channels may also be peeled off and backhauled via the secondary channel).

By contrast, in (1420), a more complex but more efficient adaptive cancellation process is used. Here as well, at least some of the upstream channels from the previous section of cable are copied (or peeled off), are remodulated for the secondary channel, and sent to the secondary channel where they can be backhauled to the cable head or plant. However in this scheme, with an appropriate delay circuit to enable proper timing, these peeled off upstream channels can be sent to an adaptive canceller, where they can then be used to suppress the desired upstream channels. This method allows for very precise control over exactly what components of the upstream signal are to be cancelled, because in some embodiments, for example for selective cancellation of certain upstream DOCSIS signals, the system can process the DOCSIS channels, extract the original DOCSIS binary data, computer the waveforms of the DOCSIS channels carrying the target binary data, and very selectively cancel only those DOCSIS channels that are carrying the appropriate binary data. This, compared to prior art filtration methods, here the invention's adaptive cancelling methods enable a vastly superior level of precision and control over exactly what primary upstream channels to suppress.

As before, after the adaptive cancellation process, new upstream signals from the next section of cable can then be injected into the cleaned up primary channel upstream data, often occupying the same frequencies that were just cleared by the adaptive cancellation process, and this new upstream data can then be carried through to the next segment of cable, where the new signals can be peeled off, converted to the secondary channel, and backhauled as desired. The net result is again to increase the upstream data carrying capacity of the CATV primary channel, by offloading much of the traffic onto the secondary channel.

Examples of Adaptive Cancellation Circuits and Methods

The following figures show some examples of adaptive cancellation circuits and methods that may be used in some of the previously described embodiments of the invention. The following discussion is not intended to be exhaustive, nor limiting, but rather is simply intended to further illustrate a number of ways in which the invention may be implemented.

In many embodiments, the secondary channel modulated first narrowcast set of information may not be directly suitable for use as a reference signal to adaptively cancel said RF modulated first narrowcast set of information. In these embodiments, it will often be necessary to, at the junction, further process this secondary channel modulated first narrowcast set of information into a form that is directly suitable for use as a reference signal to adaptively cancel said RF modulated first narrowcast set of information.

More specifically, the secondary channel modulated first narrowcast set of information that is used for adaptive cancellation purposes can be transmitted over the secondary channel in wide variety of different formats, and then processed at the junction into a suitable reference signal for adaptive cancellation purposes. Thus, for example, the first narrowcast set of information can be the source data, processed data (transport stream) a baseband signal, a passband signal, or other type of signal that can be transmitted over the secondary channel in either a digitized or non-digitized manner. What is important is that regardless of the transport mechanism and format for the secondary channel modulated first set of information, as long as it is reconstituted at or near the junction into a suitable reference signal for adaptive cancellation purposes, then the format in which the first set of information is transmitted along the secondary channel is generally not relevant, at least so long as it is not so lossy as to cause the reconstituted signal reference signal to not have a high fidelity with the corresponding primary channel signal.

Thus for example, if the first narrowcast set of information is transmitted along the secondary channel in a digital format such as an Ethernet format, and the first narrowcast set of information is transmitted along the primary channel in a QAM modulated format, then so long as at or near the junction, the Ethernet formatted first narrowcast set of information is QAM modulated into the same QAM format as the corresponding primary channel signal, then the adaptive cancellation process will work.

Figure 15A:
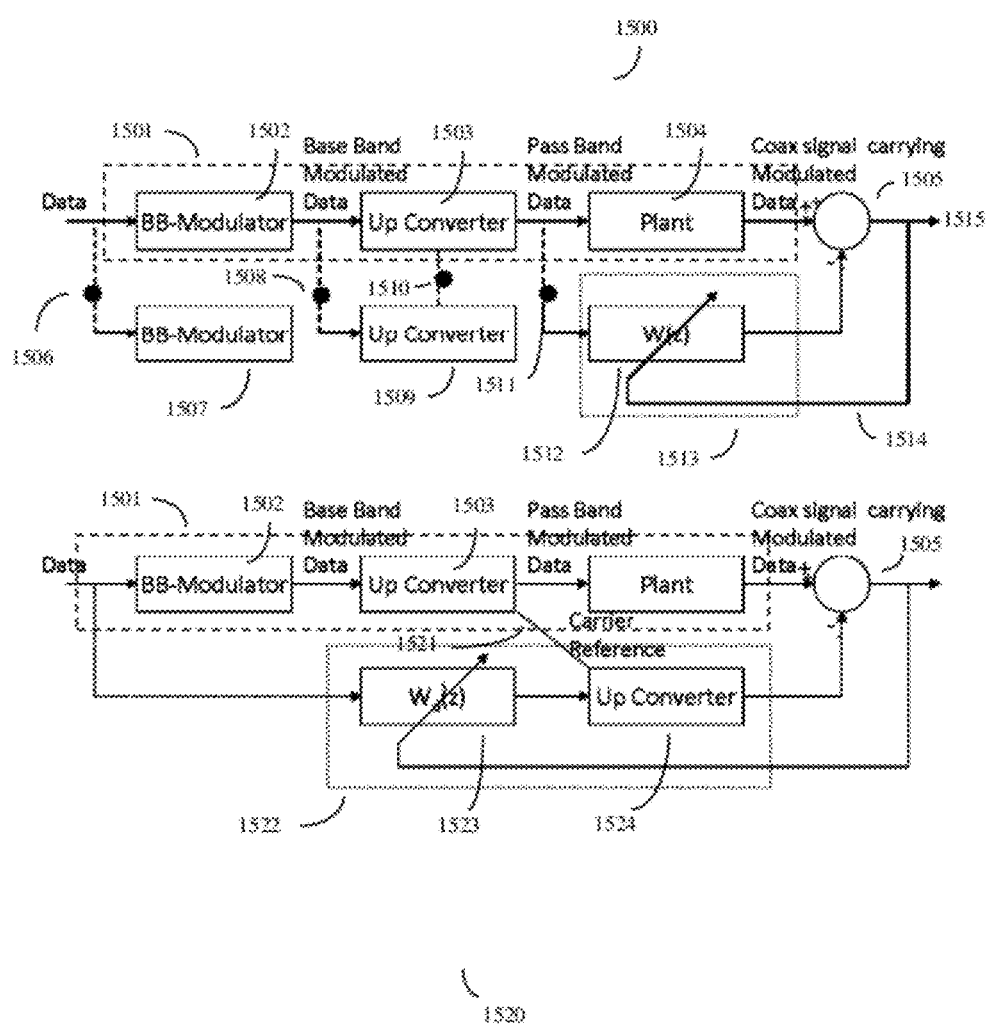
FIG. 15A shows some examples of adaptive cancellation circuits.

FIG. 15A shows some examples of adaptive cancellation circuits. In general, FIGS. 15A-D show both the various signal processing steps that are used at the cable head and plant end of the CATV signal to convert data into a primary channel CATV signal (226), where, in these various signal processing steps, signals can be obtained and rebroadcast along the secondary channel (e.g. (270) or (270A)), and also the various signal processing steps that may be done at the CFN (272) or CDN (272A) or other junctions to produce a reference signal suitable for adaptive cancelation purposes.

In (1500), we see an overview of the process, box (1501) shows an example of how before the cable plant or head end transmits a CATV RF signal, such as a narrowcast signal intended for later adaptive cancellation, data intended for narrowcast transmission can first be processed by a base band modulator, such as a QAM modulator (1502), then frequency shifted to the desired RF frequency by an up converter (1503), and then at the plant injected into the CATV cable (226), where eventually it will make its way to a junction (1505) such as a CFN (272) or CDN (272A), where at least it will be desired to adaptively cancel a narrowcast channel.

As shown in (1500) data or signals intended for subsequent transmission on the secondary channel as secondary channel narrowcast data can be of various types. For example, the data may be digital data, taken at point (1506) before it was ever base band modulated for the primary channel, base band modulated according to a possibly different scheme (1507), and transmitted along the secondary channel. Alternatively the narrowcast secondary channel data can be can be taken after the base band modulation process (1508), frequency shifted by up converter (1509) to a different frequency and then transmitted along the secondary channel. In some embodiments, the base frequency that up converter (1503) uses can be sampled and this can be transmitted and used as a reference for subsequent reference signal generation purposes. In other cases, the base band modulated (1502) and up converter (1503) frequency shifted data can be sampled and sent along the secondary channel. In any or all of these cases, at the junction, the adaptive cancelling process will first use the secondary channel data to reconstitute the narrowcast reference signal, and tailor it to match as closely as possible the narrowcast data that is transmitted along the primary channel. At the junction, the reconstituted secondary channel narrowcast reference data will be fed into the primary channel narrowcast data, and will be used with adaptive cancellation feedback (1515) to cancel out the narrowcast channel, thus producing output at the junction (1515) where the narrowcast channel has been suppressed.

In (1520) then, we see an example of the case where digital narrowcast data is sampled at step (1506), and is transmitted along the secondary channel to junction (1522) that has an adaptive cancelling device (1523) that contains its own base band modulator, such as its own QAM modulator. The system also transmits information on the secondary channel (1521) pertaining to the base frequency of the primary channel up converter (1503). Then at the junction (1522), this digital data, can first be base band modulated (1523), then up converted to the same frequency as the primary channel narrowcast signals using up converter (1524) and carrier reference information (1521), and again a reconstituted narrowcast signal is produced that can be used for adaptive cancellation as before.

Figure 15B:
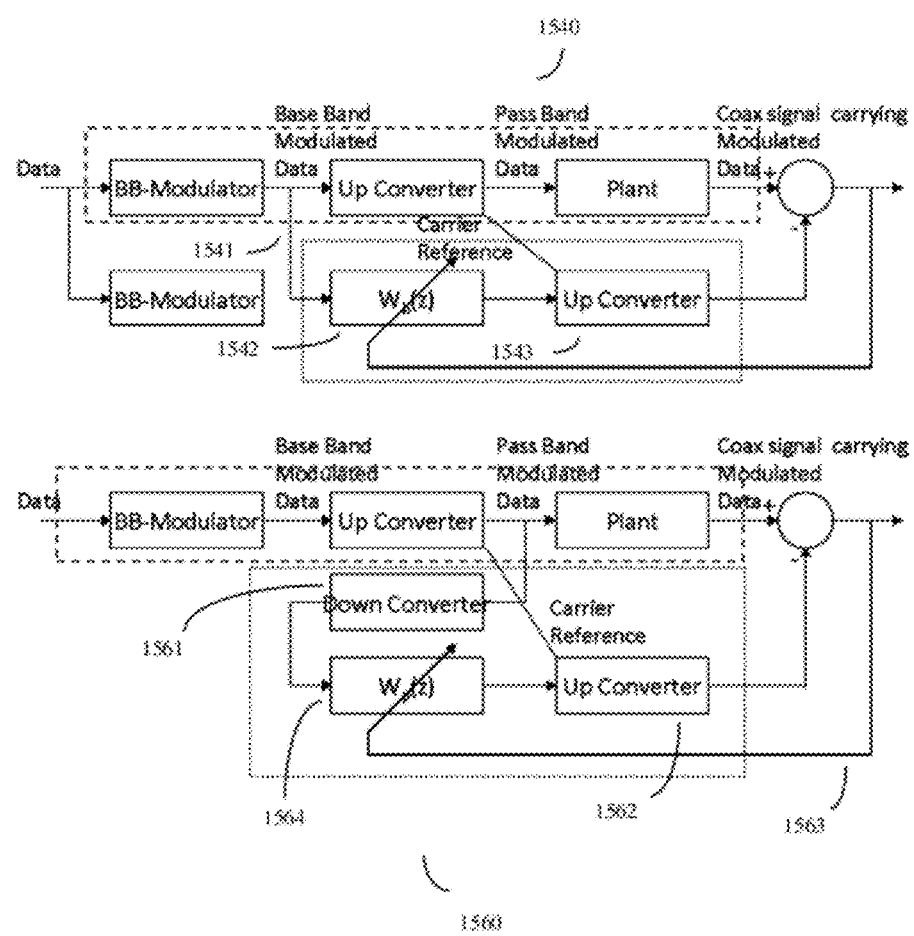
FIG. 15B shows some additional examples of adaptive cancellation circuits.

By contrast, in FIG. 15B (1540) we see a slightly different situation where here, narrowcast data or signal was sampled (1541) after the base band modulation step at (1508). Here for example, the digital data may now be QAM modulated, but likely not at the final primary channel narrowcast frequency. Here this base band modulated narrowcast signal is now transmitted along the secondary channel. At the junction, the adaptive cancellation narrowcast reference signal (1542) does not need to be baseband modulated, but in order to precisely match the primary channel narrowcast signal, it does need to be frequency matched using a junction based up converter (1543) and up converter carrier reference information. This produces a suitable reference signal for the adaptive cancellation process.

In scheme (1560), the secondary channel narrowcast information is sampled after it has been both base band modulated and frequency adjusted by the up converter (i.e. at step 1511). Here however, due to channel impairments on the primary channel, oscillator drift, and other issues, the frequency of the primary channel narrowcast signal at the various junctions is not quite exactly right. Here, in order to further facilitate the generation of a precise reference signal for adaptive cancellation purposes, at the junction, the narrowcast signal may be first down converted (i.e. frequency shifted to an alternate base frequency) at (1561), then re up converted back to the most appropriate base frequency by up converter (1562), and the base frequencies of the secondary channel narrowcast signal can be precisely matched using feedback (1563) and the adaptive canceller (1564).

FIG. 15C (1570) shows another scheme. In this alternative scheme, the secondary channel narrowcast data is obtained from after the original base band modulation step, but here the base band modulated narrowcast data is digitally sampled, for example by digitally sampling at the Nyquist rate of twice the signals bandwidth or maximum component frequency (1571). This digital sampled version of the narrowcast channel information can then be sent on the secondary channel by various signal transfer methods. Once at the node, the adaptive signal cancellation device (1572) can reconstitute the digital signals back into broad band modulated signals, up convert to the primary channel base frequency using appropriate carrier reference information, again producing a suitable reference signal for the adaptive cancellation process.

By contrast, in (1575), the analog to digital converter (1576) is sampling after the primary channel narrowcast data had been up converted. Here however, again due to channel impairments and oscillator drift, it may be desirable to further adjust the base frequency of the secondary channel data by suitable carrier reference data and a junction based up converter (1577), again producing a suitable reference signal for the adaptive cancellation process.

Figure 15D:
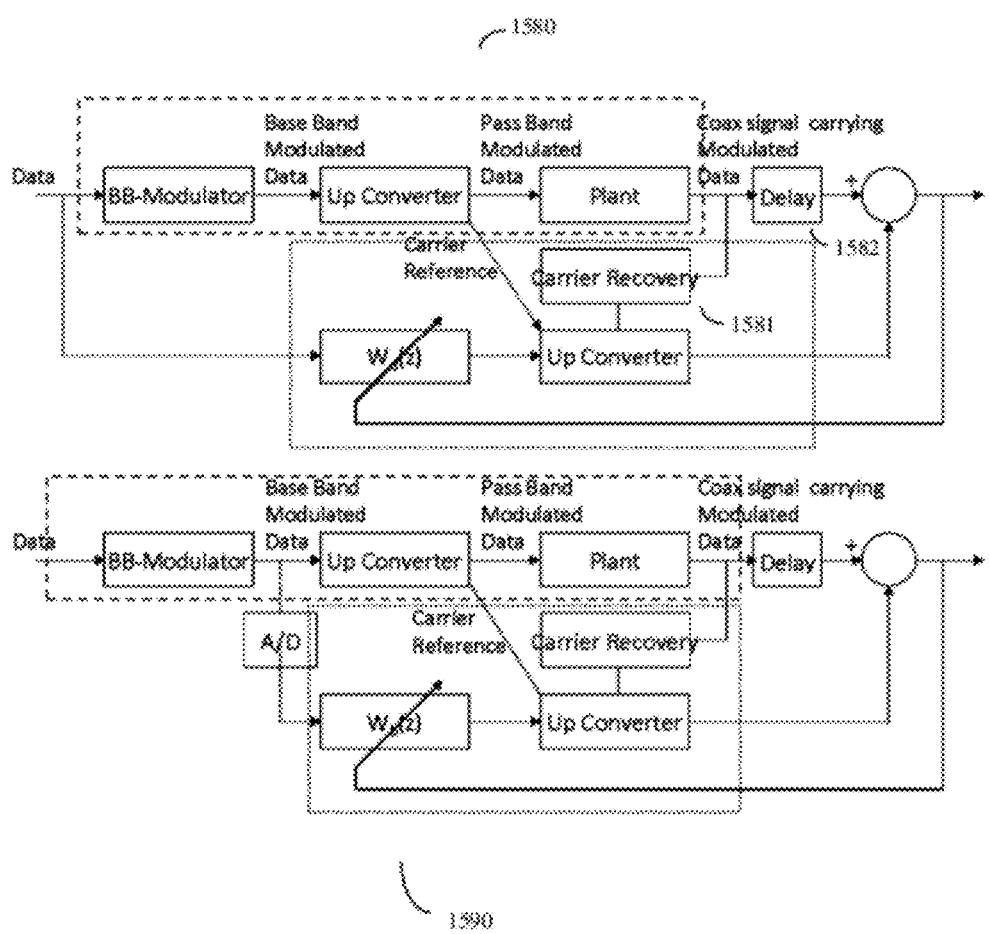
FIG. 15D shows some additional examples of adaptive cancellation circuits.

In FIG. 15D (1580) we see another alternative approach. Here the narrowcast data is taken before base band modulation at step (1506), and transmitted on the secondary channel, along with the carrier reference data (1510). Here, however, in addition to making use of the carrier reference signal to reconstitute a suitable adaptive cancellation signal at the junction, the system will also recover this carrier reference signal at the junction (carrier recovery), thus giving corrective information as to any signal impairments between the plant and the junction. There will also be a slight primary signal delay imposed at this time (1582) to allow time for all the adaptive cancellation circuitry to work properly.

In FIG. 15D (1590), we see an alternate version of this carrier recovery approach. In this embodiment, as per previous embodiment (1570), the system is analog to digital converting a base band modulated narrowcast signal, transmitting this on the secondary channel, and then using the carrier recovery methods previously described for (1580) to produce the suitable reference signal for adaptive cancellation methods.

Other methods are also possible, and this discussion is not intended to be exhaustive. Rather any type of signal transmission, signal reconstitution, and adaptive cancellation method may be used in the invention.

The invention claimed is:
1. A method for using information carried by optical fiber to prevent a first narrowcast set of RF signals from being transmitted from a first segment of a conductive cable to a connected second segment of said conductive cable, while allowing a second broadcast set of RF signals to be transmitted from said first segment to said second segment, said first segment and said second segment being connected by a junction, said method comprising:
obtaining a first narrowcast set of information from an HFC head, RF modulating said first narrowcast set of information, and transmitting said RF modulated first narrowcast set of information over said first segment;
optically modulating said first narrowcast set of information, and transmitting said optically modulated first narrowcast set of information over said optical fiber;
obtaining a second broadcast set of information from said HFC head, RF modulating said second broadcast set of information, and transmitting said RF modulated second broadcast set of information over said first segment;
at said junction, obtaining said optically modulated first narrowcast set of information, and using said optically modulated first narrowcast set of information to create a reference signal to adaptively cancel said RF modulated first narrowcast set of information, thereby preventing said RF modulated first narrowcast set of information from crossing said junction, while permitting said RF modulated second broadcast set of information to cross said junction from said first segment to said second segment.

2. The method of claim 1, further obtaining and optically modulating a third replacement narrowcast set of information, transmitting said third replacement narrowcast set of information over said optical fiber, RF modulating said third replacement narrowcast set of information at said junction, and injecting said RF modulated third replacement narrowcast set replacement of information into said second segment of said conductive cable;
  wherein said first narrowcast set of RF signals is carried on a first set of frequencies;
  wherein said third replacement narrowcast set of RF signals is carried on a third set of frequencies;
  whereby there is overlap between said first set of frequencies and said third set of frequencies;
  whereby at said junction, at least some of the first set of frequencies used to carry said first narrowcast set of RF signals on said first segment of said conductive cable are replaced by at least some of said third set of frequencies used to carry said third replacement narrowcast set of RF signals, and said third replacement narrowcast set of RF signals are transmitted over said second segment of conductive cable.

3. The method of claim 1, wherein said first narrowcast set of RF signals are transmitted over higher frequencies than said second broadcast set of RF signals.

4. The method of claim 3, wherein said junction further comprises a lowpass or bandpass RF filter tuned to selectively pass said second broadcast set of RF signals, and selectively attenuate said first narrowcast set of RF signals.

5. The method of claim 1, wherein said first narrowcast set of RF signals are transmitted over lower frequencies than said second broadcast set of RF signals.

6. The method of claim 5, wherein said junction further comprises a highpass or bandpass RF filter tuned to selectively pass said second broadcast set of RF signals, and selectively attenuate said first narrowcast set of RF signals.

7. The method of claim 1, wherein said conductive cable is a CATV cable, and said second broadcast set of RF signals comprise both upstream and downstream RF signals;
  further adding a fourth additional upstream set of upstream RF signals to said second segment of conductive cable.

8. The method of claim 7, wherein said junction blocks the transmission of said fourth additional upstream set of upstream RF signals to said first segment of conductive cable.

9. The method of claim 8, further optically modulating said fourth additional upstream set of upstream RF signals, and transmitting said optically modulated fourth additional upstream set of upstream signals using said optical fiber.

10. The method of claim 8, wherein said junction passes at least some of said fourth additional upstream set of upstream RF signals to said first segment of conductive cable.

11. The method of claim 7, further analyzing said fourth additional upstream set of upstream RF signals carried by said second segment of conductive cable at said junction, and classifying said analyzed fourth additional upstream set of upstream signals into a plurality of upstream DOCSIS channels;
  And using the information from at least some of said plurality of upstream DOCSIS channels to adaptively cancel portions of said fourth additional upstream set of upstream RF signals that carry said at least some of said plurality of upstream DOCSIS channels;
  passing a subset of said fourth additional upstream set of upstream RF signals to said first segment of conductive cable;
  wherein said subset comprises the fourth additional upstream set of upstream RF signals, minus the adaptively canceled portions of said fourth additional upstream set of upstream RF signals that carry said at least some of said plurality of upstream DOCSIS channels; and
  transmitting the information carried by the adaptively canceled portions of said fourth additional upstream set of upstream RF signals that carry said at least some of said plurality of upstream DOCSIS channels using said optical fiber.

12. The method of claim 1, wherein said junctions are Coax Fiber Terminals;
  said conductive fiber and said optical fiber comprises a hybrid fiber cable (HFC) network with a cable head, at least one trunk optical fiber, at least one trunk optical fiber node terminating on at least one CATV trunk cable, said CATV trunk cable connected to a plurality of CATV active devices, with at least one branch CATV cables connected to said plurality of CATV active devices, thus forming a CATV Tree and Branch Network, and a plurality of cable modems or Ethernet terminals connected to said CATV Tree and Branch Network;
  wherein at least one shadow optical fiber runs from said trunk optical fiber to Coax Fiber Terminals associated with at least some of said plurality of CATV active devices;
  wherein said Coax Fiber Terminals are connected to said CATV cable, and partition said CATV cable into segments using said adaptive canceling methods.

13. The method of claim 12, further obtaining and optically modulating a third replacement narrowcast set of information, transmitting said third replacement narrowcast set of information over said optical fiber, RF modulating said third replacement narrowcast set of information at said Coax Fiber Terminals, and injecting said RF modulated third replacement narrowcast set of information into said second segment of said conductive cable;
  wherein said first narrowcast set of RF signals is carried on a first set of wavelengths;
  wherein said third replacement narrowcast set of RF signals is carried on a third set of wavelengths;
  whereby there is overlap between said first set of wavelengths and said third set of wavelengths;
  whereby at said Coax Fiber Terminals, at least some of the first set of wavelengths used to carry said first narrowcast set of RF signals on said first segment of said conductive cable are replaced by at least some of said third replacement narrowcast set of wavelengths used to carry said third replacement narrowcast set of RF signals, and said third replacement narrowcast set of RF signals are transmitted over said second segment of conductive cable.

14. The method of claim 1, wherein said first narrowcast set of information is carried in a digital data format that is different from said first narrowcast set of RF signals, and wherein at said junction, said digital data is repackaged into a reference signal to adaptively cancel said RF modulated first narrowcast set of information.

* * * * *